(12) United States Patent
Lilko et al.

(10) Patent No.: US 10,073,956 B2
(45) Date of Patent: Sep. 11, 2018

(54) INTEGRATION SERVICES SYSTEMS, METHODS AND COMPUTER PROGRAM PRODUCTS FOR ECM-INDEPENDENT ETL TOOLS

(71) Applicant: OPEN TEXT SA ULC, Halifax (CA)

(72) Inventors: Alexander Lilko, Maple (CA); Martin Brousseau, Mont-Saint-Hilaire (CA)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 15/471,823

(22) Filed: Mar. 28, 2017

(65) Prior Publication Data

US 2017/0199989 A1 Jul. 13, 2017

Related U.S. Application Data

(63) Continuation-in-part of application No. 14/210,536, filed on Mar. 14, 2014.
(Continued)

(51) Int. Cl.
*G06F 21/00* (2013.01)
*G06F 21/10* (2013.01)
(Continued)

(52) U.S. Cl.
CPC ........ *G06F 21/10* (2013.01); *G06F 17/30563* (2013.01); *G06F 21/604* (2013.01); *G06F 21/6218* (2013.01); *H04L 63/101* (2013.01)

(58) Field of Classification Search
CPC .. G06F 21/10; G06F 21/604; G06F 17/30563; G06F 21/6218; H04L 63/101
See application file for complete search history.

(56) References Cited

U.S. PATENT DOCUMENTS 6,301,584 B1 10/2001 Ranger
7,349,913 B2 3/2008 Clark et al.
(Continued)

OTHER PUBLICATIONS

Wu et al., "Web Crawler Middleware for Search Engine Digital Libraries: A Case Study for CiteSeerX", WIDM'12, Nov. 2, 2012, Maui, Hawaii, USA, © 2012, ACM, ISBN: 978-1-4503-1720-7, pp. 57-64.
(Continued)

*Primary Examiner* — Mahfuzur Rahman
(74) *Attorney, Agent, or Firm* — Sprinkle IP Law Group

(57) ABSTRACT

To resolve a conflict between CMIS secondary types and certain ECM features such as content server categories, and allow the underlying ECM system to be fully CMIS-compliant, an ECM-independent ETL tool comprising a CMIS-compliant, repository-specific connector is provided. Operating on an integration services server at an integration tier between an application tier and a storage tier where the repository resides, the connector is particular configured to support CMIS secondary types and specific to the repository. On startup, the connector can import any category definition from the repository. The category definition contains properties associated with a category in the repository. When the category is attached to a document, the properties are viewable via a special category object type and a category identifier for the category. Any application can be adapted to leverage the ECM-independent ETL tool disclosed herein.

17 Claims, 28 Drawing Sheets

Related U.S. Application Data

(60) Provisional application No. 61/782,984, filed on Mar. 14, 2013.

(51) Int. Cl.
  *G06F 21/62* (2013.01)
  *G06F 21/60* (2013.01)
  *G06F 17/30* (2006.01)
  *H04L 29/06* (2006.01)

(56) References Cited

U.S. PATENT DOCUMENTS

| | | | |
|---|---|---|---|
| 7,512,638 B2 | 3/2009 | Jhaveri et al. | |
| 7,532,340 B2 | 5/2009 | Koppich et al. | |
| 7,725,465 B2 | 5/2010 | Liao et al. | |
| 7,770,214 B2 | 8/2010 | Lee et al. | |
| 8,170,902 B2 | 5/2012 | Kennis et al. | |
| 8,271,336 B2 | 9/2012 | Mikurak | |
| 8,296,718 B2 | 10/2012 | Appleyard et al. | |
| 8,327,419 B1 | 12/2012 | Korablev et al. | |
| 8,352,475 B2 | 1/2013 | Bhatkar et al. | |
| 8,578,442 B1 | 11/2013 | Banjeree | |
| 9,898,537 B2 | 2/2018 | Leclerc et al. | |
| 2002/0198858 A1* | 12/2002 | Stanley | G06F 17/30286 706/50 |
| 2004/0230605 A1 | 11/2004 | Tamboli et al. | |
| 2005/0138081 A1 | 6/2005 | Alshab et al. | |
| 2007/0005679 A1 | 1/2007 | Bui | |
| 2007/0156601 A1* | 7/2007 | Brew | G06F 21/10 705/57 |
| 2007/0198539 A1 | 8/2007 | Warshavsky | |
| 2008/0082575 A1 | 4/2008 | Peter et al. | |
| 2008/0244429 A1 | 10/2008 | Stading | |
| 2010/0076992 A1 | 3/2010 | Barstow | |
| 2010/0100535 A1 | 4/2010 | Melancon | |
| 2011/0150218 A1 | 6/2011 | Trost et al. | |
| 2011/0167105 A1 | 7/2011 | Ramakrishnan et al. | |
| 2011/0191326 A1 | 8/2011 | Gutlapalli | |
| 2011/0246444 A1 | 10/2011 | Jenkins et al. | |
| 2011/0264638 A1 | 10/2011 | Wong | |
| 2012/0120086 A1 | 5/2012 | Dang | |
| 2012/0191716 A1 | 7/2012 | Omoigui | |
| 2012/0254162 A1 | 10/2012 | Asadullah et al. | |
| 2012/0290910 A1 | 11/2012 | Kumar et al. | |
| 2012/0310914 A1 | 12/2012 | Khan | |
| 2013/0219456 A1 | 8/2013 | Sharma | |
| 2013/0275429 A1 | 10/2013 | York | |
| 2014/0129493 A1 | 5/2014 | Leopold | |
| 2014/0282910 A1 | 9/2014 | Palmer et al. | |
| 2015/0058314 A1 | 2/2015 | Leclerc | |
| 2017/0199989 A1 | 7/2017 | Lilko et al. | |
| 2017/0201523 A1 | 7/2017 | Palmer et al. | |

OTHER PUBLICATIONS

Fornge, "A Framework for Secure Management of Web Services (SMaWS) in Enterprise Application Integration," Jan. 18. 2008, 148 pgs.

Chen, "Oracle Fusion Middleware 11gR1 on SuSE Linux Enterprise Server 11 SP1 (Installation Guide)", Novell Inc., Sep. 10, 2010, 148 pgs.

Extended European Search Report for European Patent Application No. 14 159 796.3, dated Jul. 9, 2014, 8 pgs.

Hollander, Dave, "Common Models in Soa—Tackling the Data Integration Problem," Progress Software Corporation, 2008, 24 pgs.

Dinesh Dhamija "Synchronization of Information in Multiple Heterogeneous Manufacturing Databases," Mar. 1999, 256 pgs.

Office Action for U.S. Appl. No. 14/210,536, dated Jun. 30, 2015, 18 pgs.

Office Action for U.S. Appl. No. 14/210,536, dated Dec. 16, 2015, 20 pgs.

Choy, David, et al., "Content Management Interoperability Services (CMIS) Version 1.0," OASIS Standard, May 1, 2010, 229 pgs.

Office Action for U.S. Appl. No. 14/527,237, dated May 19, 2015, 38 pgs.

Office Action for U.S. Appl. No. 14/210,536, dated Oct. 5, 2016, 22 pgs.

Office Action for U.S. Appl. No. 14/210,536, dated May 3, 2017, 22 pgs.

Office Action for U.S. Appl. No. 14/527,237, dated Mar. 23, 2017, 33 pgs.

Notice of Allowance issued for U.S. Appl. No. 14/527,237, dated Oct. 6, 2017, 10 pages.

Examination Report issued for European Patent Application No. 14 159 796.3, dated Oct. 23, 2017, 5 pages.

* cited by examiner

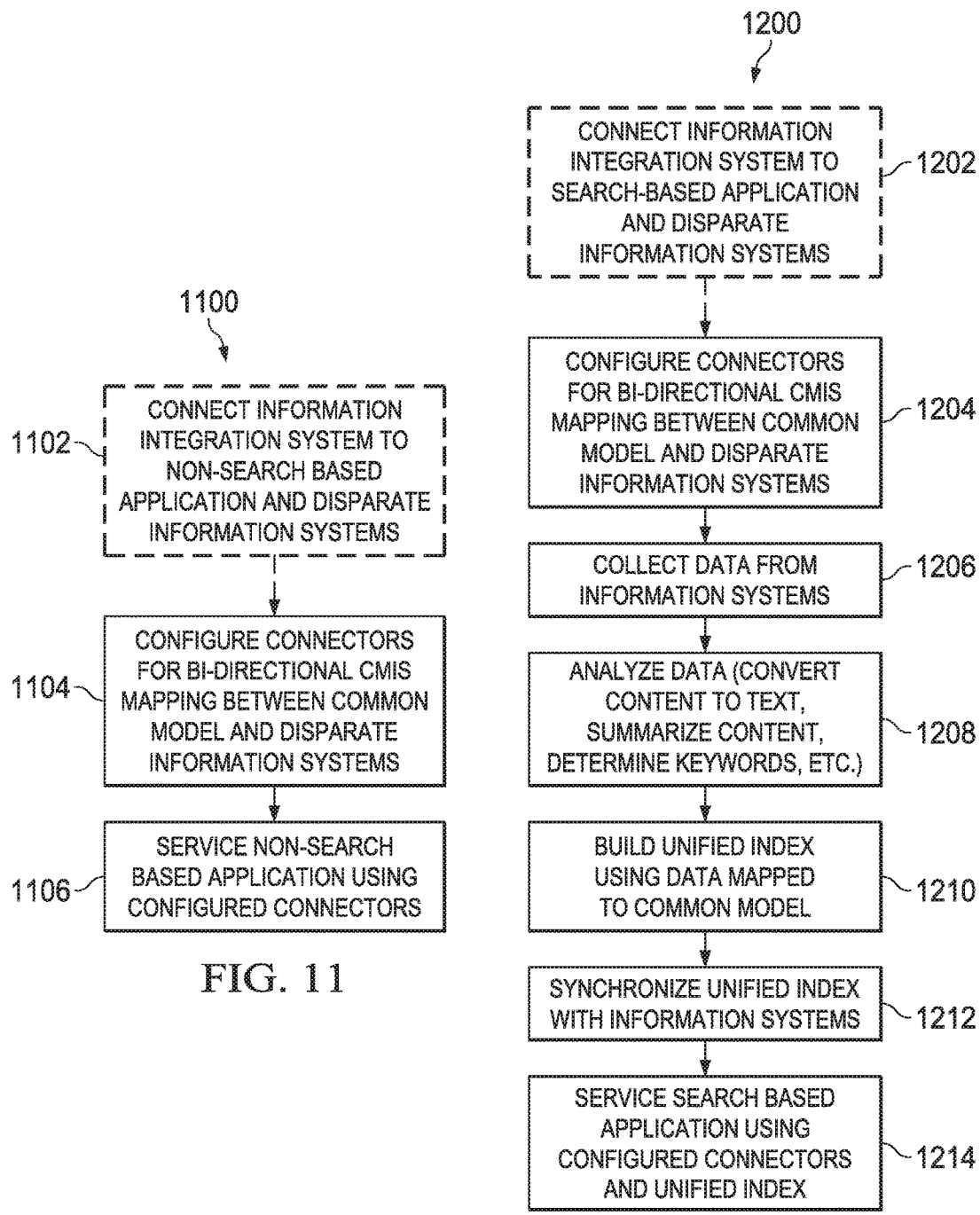

FIG. 13

| Connector | | ContentServer CWS Connector | | | | | | | | |
|---|---|---|---|---|---|---|---|---|---|---|
| | | General Objects | | | | | | | | |
| Types & Operations 1700 | | Create | Read | Update | Delete | Process Type Specific Properties | Add Version | Download Version | Delete Version | Query |
| cmis:folder | cmis:folder<br>Appearance (480)<br>Channel (207)<br>Collection (298)<br>CompoundDocument (136)<br>Discussion (215)<br>EmailFolder (751)<br>EnterpriseWorkspace (141)<br>Folder (0)<br>Folder (Folder)<br>HierarchicalStorageFolder (31109)<br>PersonalWorkspace (142)<br>Project (202)<br>TaskList (204)<br>VirtualContainer (-1)<br>VirtualFolder (899) | <br><br>X<br><br><br><br><br><br>X<br>X<br><br><br><br><br><br> | <br>X<br>X<br>X<br>X<br>X<br>X<br>X<br>X<br>X<br>X<br>X<br>X<br>X<br>X<br>X | <br>X<br>X<br><br><br><br><br><br>X<br>X<br><br><br><br><br><br> | <br><br>X<br><br><br><br><br><br>X<br>X<br><br><br><br><br><br> | <br><br><br><br><br><br><br><br>X<br>X<br><br><br><br><br><br> | | | | <br>X<br>X<br><br><br><br><br>X<br>X<br>X<br><br><br><br><br><br> |
| cmis:document | cmis:document<br>ActiveView (30309)<br>Category (131) ←1701<br>CustomView (146)<br>Document (141)<br>Document (Document)<br>Email (749)<br>FormTemplate (230)<br>WorkflowMap (128)<br>XML DTD (335) | <br><br>X<br><br>X<br>X<br><br><br><br> | <br>X<br>X<br>X<br>X<br>X<br>X<br>X<br>X<br>X | <br><br>X<br><br>X<br>X<br><br><br><br> | <br><br>X<br><br>X<br>X<br><br><br><br> | <br><br><br><br>X<br>X<br>X<br><br><br> | <br><br><br><br>X<br>X<br><br><br><br> | <br><br><br><br>X<br>X<br><br><br><br> | <br><br><br><br>X<br>X<br><br><br><br> | <br><br>X<br><br>X<br>X<br><br><br><br> |
| cmis:item | cmis:item<br>LiveReport (299)<br>Poll (218)<br>Prospector (384)<br>Shortcut (1)<br>URL (140)<br>WorkflowStatus (190) | | X<br>X<br>X<br>X<br>X<br>X | | | | | | | |
| cmis:secondary | cmis:secondary<br>subtype:131 (Category)<br>subtype:196 (Classification Tree)<br>subtype:199 (Classification)<br>subtype:551 (RM Classification)<br>subtype:9834 (RM Hold) | X<br><br><br><br> | X<br>X<br>X<br>X<br>X | X<br><br><br><br> | X<br><br><br><br> | X<br>X<br>X<br>X<br>X | | | | |

| ContentServer CWS Connector | | | | | | | | | | | | Connector | |
|---|---|---|---|---|---|---|---|---|---|---|---|---|---|
| Categories (attached) | | | | RM Classifications (attached) | | | | RM Holds (attached) | | | | Types & Operations | |
| Attach | Read Properties | Update Properties | Detach | Attach | Read Properties | Update Properties | Detach | Attach | Read Properties | Update Properties | Detach | | |
| | | | | | | | | | | | | cmis:folder | cmis:folder |
| X | X | X | X | | | | | | | | | Appearance (480) | |
| X | X | X | X | | | | | | | | | Channel (207) | |
| | | | | | | | | | | | | Collection (298) | |
| | | | | | | | | | | | | CompoundDocument (136) | |
| | | | | | | | | | | | | Discussion (215) | |
| | | | | | | | | | | | | EmailFolder (751) | |
| | | | | | | | | | | | | EnterpriseWorkspace (141) | |
| X | X | X | X | X | X | X | X | X | X | X | X | Folder (0) | |
| X | X | X | X | X | X | X | X | X | X | X | X | Folder (Folder) | |
| | | | | | | | | | | | | HierarchicalStorageFolder (31109) | |
| | | | | | | | | | | | | PersonalWorkspace (142) | |
| | | | | | | | | | | | | Project (202) | |
| | | | | | | | | | | | | TaskList (204) | |
| | | | | | | | | | | | | VirtualContainer (-1) | |
| | | | | | | | | | | | | VirtualFolder (899) | |
| | | | | | | | | | | | | cmis:document | cmis:document |
| | | | | | | | | | | | | ActiveView (30309) | |
| | | | | | | | | | | | | Category (131) | |
| | | | | | | | | | | | | CustomView (146) | |
| X | X | X | X | X | X | X | X | X | X | X | X | Document (141) | |
| X | X | X | X | X | X | X | X | X | X | X | X | Document (Document) | |
| | | | | | | | | | | | | Email (749) | |
| | | | | | | | | | | | | FormTemplate (230) | |
| | | | | | | | | | | | | WorkflowMap (128) | |
| | | | | | | | | | | | | XML DTD (335) | |
| | | | | | | | | | | | | cmis:item | cmis:item |
| | | | | | | | | | | | | LiveReport (299) | |
| | | | | | | | | | | | | Poll (218) | |
| | | | | | | | | | | | | Prospector (384) | |
| | | | | | | | | | | | | Shortcut (1) | |
| | | | | | | | | | | | | URL (140) | |
| | | | | | | | | | | | | WorkflowStatus (190) | |
| | | | | | | | | | | | | cmis:secondary | cmis:secondary |
| | | | | | | | | | | | | subtype:131 (Category) | |
| | | | | | | | | | | | | subtype:196 (Classification Tree) | |
| | | | | | | | | | | | | subtype:199 (Classification) | |
| | | | | | | | | | | | | subtype:551 (RM Classification) | |
| | | | | | | | | | | | | subtype:9834 (RM Hold) | |

FROM FIG. 17A

| | | | csu_clt_2 ∨ | | ClassificationTree1 ∨ | | pngRMCTree1 ∨ |
| | | | | | Classification_1_1, RNClassification_1_1 | | pngRMC1_A, pngRMC1_B | csu_rmc_3, Classification,
Classification Shortcut_2, ClassificationShortcut,
ClassificationShortcut-1

Classification Trees

| Pulse From Here | | | | | | |
|---|---|---|---|---|---|---|
| All Users | My Colleagues | | | | | |

There are no items to display.

| | Type | Name ▲ | | | Size | Modified |
|---|---|---|---|---|---|---|
| ☐ | | csu_clt_1 ∨ | | | 6 Items | 11/14/2016 07:47 PM |
| ☐ | | csu_clt_2 ∨ | | | 0 Items | 11/14/2016 07:47 PM |
| ☐ | | csu_prov ∨ | | | 2 Items | 11/14/2016 08:03 PM |
| ☐ | | csu_rmc_1 ∨ | | | 1 Item | 10/20/2016 03:15 PM |
| ☐ | | csu_rmc_2 ∨ | | | 1 Item | 10/20/2016 10:59 AM |
| ☐ | | ClassificationTree_1 ∨ | | | 2 Items | 09/01/2016 10:59 AM |
| ☐ | | hzrmc ∨ | | | 0 Items | 07/07/2016 12:44 PM |
| ☐ | | pngRMC1 ∨ | | | 0 Items | 10/28/2016 04:15 PM |
| ☐ | | pngRMC2 ∨ | | | 0 Items | 10/28/2016 04:17 PM |
| ☐ | | pngRMCTree1 ∨ | | | 2 Items | 10/28/2016 04:19 PM |
| ☐ | | RMC1 ∨ | | | 0 Items | 10/14/2016 04:43 PM |
| ☐ | | RMClassification_1 ∨ | | | 1 Item | 09/22/2016 03:34 PM |
| ☐ | | RMClassification_2 ∨ | | | 1 Item | 09/23/2016 01:14 PM |
| ☐ | | Yan_RM ∨ | | | 0 Items | 10/27/2016 02:47 PM |

Copy  Move  Delete ✕

Connection | Repository Info | Types | Query | Change Log | Console | TCK | Create Object | Log | Info TESTS_Z/_CATEGORY_TESTS_ | go

| Name | Type |
|---|---|
| _CATEGORIES_ | 0 |
| _Fol_2016_10_12__14_47_11.576 | 0 |
| _Fol_2016_10_13__09_28_40.868 | 0 |
| _Fol_2016_10_14__14_39_52.886 | 0 |
| _Fol_2016_10_14__14_54_33.648 | 0 |
| _Fol_2016_11_23__10_23_01.588 | 0 |
| _Fol_2016_11_23__10_30_38.702 | 0 |
| Cat_ver_test | 131 |
| Doc_3_Category_1_v1 | 144 |
| Doc_Cat_1_v1 | 144 |
| Doc_Cat_1_v2 | 144 |
| _Fol_2016_10_12__14_14_56.423 | 0 |
| _Fol_2016_10_12__15_48_36.169 | 0 |
| _Fol_2016_10_12__15_53_35.546 | 0 |
| _Fol_2016_10_12__16_02_10.267 | 0 |
| _Fol_2016_10_12__16_04_33.754 | 0 |
| _Fol_2016_10_12__16_06_21.059 | 0 |
| _Fol_2016_10_12__16_09_50.722 | 0 |
| _Fol_Cat_1_Cat_2_Cat_3 | 0 |
| _Fol_Category_2 | 0 |

Object | Actions | Properties | Relationships | Renditions | ACL | Policies | Versions | Type | Extensions

| Name | Type | Value | Property ID | Object Type ID |
|---|---|---|---|---|
| Is Latest Major Version | boolean | true | cmis:isLatestMajorVersion | 131 |
| Is Latest Version | boolean | true | cmis:isLatestVersion | 131 |
| Is Major Version | boolean | true | cmis:isMajorVersion | 131 |
| Is Version Series Checked Out | boolean | false | cmis:isVersionSeriesCheckedOut | 131 |
| Last Modification Date | datetime | 2016-09-26 1... | cmis:lastModificationDate | 131 |
| Name | string | Cat_ver_test | cmis:name | 131 |
| ObjectId | id | 131:77037:0 | cmis:objectId | 131 |
| Object Type Id | id | 131 | cmis:objectTypeId | 131 |
| Parent Id | id | 0.76881 | cmis:parentId | 131 |
| Version Label | string | 10 | cmis:versionLabel | 131 |
| Version Series Checked Out By | string | not set | cmis:versionSeriesCheckedOutBy | 131 |
| Version Series Id | id | 131:77037 | cmis:versionSeriesId | 131 |
| Associated Secondary Type Id | string | 131:77037 | ifis:associatedSecondaryTypeId | 131 |
| directLink | string | 77037 | ifis:directLink | 131 |
| AdVersionControl | boolean | false | ObjectInfo:AdVersionControl | 131 |
| Catalog | integer | 0 | ObjectInfo:Catalog | 131 |
| Comment | string | | ObjectInfo:Comment | 131 |
| Container | boolean | false | ObjectInfo:Container | 131 |
| CreatedBy | integer | 34636 | ObjectInfo:CreatedBy | 131 |
| GroupID | integer | 1001 | ObjectInfo:GroupID | 131 |
| GroupPerm | integer | 128 | ObjectInfo:GroupPerm | 131 |

FIG. 25A

| ↻ Reload | ⚙ Check Compliance | ⬇ Save Type Definition | ✎ Update Type | ⊟ Delete Type | ⊞ Create Type |

- 🏷 CMIS Folder (cmis:folder)
- 🏷 CMIS Document (cmis:document)
- 🏷 CMIS Item (cmis:item)
- ▼ 🏷 CMIS Secondary Type (cmis:secondary)
    - ▼ 🏷 Category Definitions (CategoryVirtualContainer)
        - 🏷 CatWS.Cat_1 (131.76215)
    - ▼ 🏷 Records Management Items (RecordsManagementVirtualContainer)
        - ▼ 🏷 RM Classifications (RMClassificationVirtualContainer)
            - 🏷 _csu_rmc_2_ (551:45306)
            - 🏷 RM-Classification (551:91220)
            - 🏷 _csu_rmc_1_ (551:45415)
            - 🏷 RM-Folder (551:91140)
            - 🏷 001 (551:91141)
            - 🏷 RM Part (551:91424)
            - 🏷 __csu_clt_1__ (196:71046)
            - 🏷 __csu_rmc_3__ (551:71047)
            - 🏷 Classification (199:91144)
            - 🏷 Classification2 (199:107758)
            - 🏷 hzrmc (551:71386)
            - 🏷 RMClassification_1 (551:77233)
            - 🏷 RMFolder_1_1 (551:77234)
            - 🏷 001 (551:77235)
            - 🏷 RMClassification_2 (551:77236)
            - 🏷 RMClassification_2_1 (551:77237)
            - 🏷 ClassificationTree_1 (196:77238)
            - 🏷 Classification_1_1 (199:77239)
            - 🏷 Classification_1_1_1 (1999:77241)
            - 🏷 RMClassification_1_1 (551:77240)
            - 🏷 RMC1 (551:89685)
            - 🏷 __csu_prov__ (551:91559)
            - 🏷 Provenance-Enabled (551:91663)
            - 🏷 Provenance-Disabled (551:91664)
            - 🏷 Yan_RM (551:101933)
            - 🏷 pngRMC1 (551:101945)
            - 🏷 pngRMC2 (551:101946)
            - 🏷 pngRMCTree1 (196:101947)
            - 🏷 pngRMC1_B (551:102857)
            - 🏷 pngRMC1_A (551:103163)
            - 🏷 __csu_clt_2__ (196:107835)
    - ▶ 🏷 RM Holds (RMHoldVirtualContainer)

| Name: | _csu_rmc_2_ |
|---|---|
| Description: | |
| Id: | 551:45306 |
| Local Namespace: | http://opentext.com/infofus |
| Local Name: | _csu_rmc_2_ |
| Query Name: | subtype:551 |
| Base Type: | 🔖 cmis:secondary |
| Creatable: | ✓ Yes |
| Fileable: | ✗ No |
| Queryable: | ✗ No |
| In Super Type Queries: | ✓ Yes |
| Full Text Indexed: | ✗ No |
| ACL Controlable: | ✗ No |
| Policy Controlable: | ✗ No |
| Type Mutability: | |
| Versionable: | |
| Content Stream Allowed: | |
| Allowed Source Types: | |
| Allowed Target Types: | |
| Extensions: | ▼ 📎 (http://opentext.com<br>▼ 📎 (http://opentext.<br>📎 (http://opent<br>📎 (http://opent<br>📎 (http://opent<br>📎 (http://opent<br>📎 (http://opent<br>📎 (http://opent<br>📎 (http://opent |

| Name | Type |
|---|---|
| RM Classification (45306) value ... | 551:45306 |
| accession | RMAdditionalInfo:45306:acce |
| addressee | RMAdditionalInfo:45306:addr |
| classID | RMAdditionalInfo:45306:class |
| cyclePeriod | RMAdditionalInfo:45306:cycle |
| docDate | RMAdditionalInfo:45306:docD |
| essential | RMAdditionalInfo:45306:esse |
| establishment | RMAdditionalInfo:45306:esta |
| lastReviewDate | RMAdditionalInfo:45306:lastR |
| nextReviewDate | RMAdditionalInfo:45306:next |
| official | RMAdditionalInfo:45306:offici |
| officialRemove | RMAdditionalInfo:45306:offici |
| originator | RMAdditionalInfo:45306:origin |
| receivedDate | RMAdditionalInfo:45306:rece |
| rmRetentionDays | RMAdditionalInfo:45306:rmR |
| rmRetentionMode | RMAdditionalInfo:45306:rmR |
| rsi | RMAdditionalInfo:45306:rsi |
| sentTo | RMAdditionalInfo:45306:sent |
| status | RMAdditionalInfo:45306:statu |
| statusDate | RMAdditionalInfo:45306:statu |
| storage | RMAdditionalInfo:45306:stora |
| subject | RMAdditionalInfo:45306:subj |

FROM FIG. 25A

| | |
|---|---|
| Name: | RM Classification (45306) value |
| Description: | RM Classification (45306) value prope |
| Id: | 551:45306 |
| Local Namespace: | |
| Local Name: | RM Classification (45306) value prope |
| Query Name: | 551:45306 |
| Property Type: | string |
| Cardinality: | multi |
| Updatability: | readonly |
| Queryable: | ✕ No |
| Orderable: | ✕ No |
| Required: | ✕ No |
| Inherited: | ✕ No |
| Default Value: | RMAdditionalInfo:45306:accession |
| | RMAdditionalInfo:45306:addressee |
| | RMAdditionalInfo:45306:classID |
| | RMAdditionalInfo:45306:cyclePeriod |
| | RMAdditionalInfo:45306:docDate |
| | RMAdditionalInfo:45306:essential |
| | RMAdditionalInfo:45306:establishmen |
| | RMAdditionalInfo:45306:lastReviewDa |
| | RMAdditionalInfo:45306:nextReviewD |
| | RMAdditionalInfo:45306:official |
| | RMAdditionalInfo:45306:officialRemov |
| | RMAdditionalInfo:45306:originator |
| | RMAdditionalInfo:45306:receiveDate |
| | RMAdditionalInfo:45306:rmRetentionD |
| | RMAdditionalInfo:45306:rmRetentionM |
| | RMAdditionalInfo:45306:rsi |
| | RMAdditionalInfo:45306:sentTo |
| | RMAdditionalInfo:45306:status |
| | RMAdditionalInfo:45306:statusDate |
| | RMAdditionalInfo:45306:storage |
| | RMAdditionalInfo:45306:subject |
| Open Choice: | ✕ No |
| Choices: | |
| Max Length: | |
| Min: | |

INTEGRATION SERVICES SYSTEMS, METHODS AND COMPUTER PROGRAM PRODUCTS FOR ECM-INDEPENDENT ETL TOOLS

CROSS-REFERENCE TO RELATED APPLICATIONS

This is a continuation-in-part of U.S. patent application Ser. No. 14/210,536, filed Mar. 14, 2014, entitled "SYSTEMS, METHODS AND COMPUTER PROGRAM PRODUCTS FOR INFORMATION INTEGRATION ACROSS DISPARATE INFORMATION SYSTEMS," which is a conversion of, and claims a benefit of priority under 35 U.S.C. § 119 from U.S. Provisional Application No. 61/782,984, filed Mar. 14, 2013, entitled "SYSTEM, METHOD AND COMPUTER PROGRAM PRODUCT FOR INFORMATION INTEGRATION ACROSS DISPARATE INFORMATION SYSTEMS," both of which are incorporated by reference as if set forth herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to information management. More particularly, embodiments disclosed herein relate to an inventive versatile and extensible solution for integrating information across disparate data sources such as information systems.

BACKGROUND

Information integration refers to the merging of information from heterogeneous sources with differing conceptual, contextual and typographical representations. Typically, information integration refers to textual representations of data mined and consolidated from unstructured or semi-structured resources. One example of an information integration technology is based on data warehousing where a data warehouse system extracts information from source databases, transforms the extracted information, and then loads the transformed information into a data warehouse. This technology, however, requires that the information must be stored in a single database with a single schema. Thus, when a new source is added to a system such as a content server, the entire new data set from the new source would need to be manually integrated to comply with the existing database schema.

Another issue is the disparate nature of sources providing the information. It can be extremely difficult and expensive for any single enterprise to collect and integrate all the desired information from disparate sources. To this end, a virtual data integration solution may be used. To implement a virtual data integration solution, application developers may construct a virtual schema against which users can run queries. Additionally, the application developers may design wrappers or adapters for each data source. When a user queries the virtual schema, the query is transformed into appropriate queries over the respective data sources. The wrappers or adapters simply transform local query results returned by the respective data sources into a processed form. A virtual database combines the results of these queries into the answer to the user's query. This technology, however, is not extensible. When a new source is added to a system, a virtual schema must be constructed and new wrappers or adapters written for the new source.

The aforementioned information integration technologies exemplify challenges in the field of information management. There are continuing needs for sharing, accessing, aggregating, analyzing, managing, and presenting information stored in disparate information systems such as content servers, document servers, content repositories, and so on in a unified, cohesive, synchronized, efficient, and secure manner.

SUMMARY OF THE DISCLOSURE

An object of the invention is to address challenges and needs in the field of information management. Another object of the invention is to extend control and influence over content owned or under control by an entity such as a business or organization. Yet another object of the invention is to enable entities to manage content stored in disparate information systems and perhaps shared among users having different job functions and/or roles. Another object of the invention is to extend control and exposure of all the data in an enterprise, whether the data is originated within the enterprise or from third parties outside of the enterprise. Yet another object of the invention is to provide reusable components such as connectors, interfaces, content analytics and so on that can be used to build search based applications.

As described below, these and other objects of the invention can be realized by way of an information integration system that enables applications to access, aggregate, analyze, manage, and present information stored in disparate information systems to end users and developers alike in a unified, cohesive, synchronized, efficient, and secure manner. Examples of applications may include various enterprise applications such as web based applications, search based applications, and non-search applications, etc.

In some embodiments, an information integration system may include a set of integration services embodied on one or more server machines in a computing environment. The set of integration services may include connectors communicatively connected to disparate information systems. These connectors, which may be of a single type or of different types, may be configured for integrating data stored in the disparate information systems utilizing a common model employed by the set of integration services.

The common model may overlay, augment, integrate, or otherwise utilize a content management interoperability services (CMIS) data model and may include common property definitions and a common security model. CMIS is an open standard that allows different content management systems to interoperate over the Internet. In addition to the CMIS data model, the common security model may include permissions particularly defined for use by the set of integration services. These common property definitions and permissions may be uniquely defined and utilized by the information integration system.

In some embodiments, a method for information integration may include deploying a set of integration services on one or more server machines in a computing environment, the set of integration services having a set of connectors communicatively connected to disparate information systems. The method may further include integrating, via the set of connectors, data stored in the disparate information systems utilizing a common model employed by the set of integration services. The common model may implement an embodiment of the common model overlaying the CMIS data model and may include common property definitions and a common security model. The common security model may include permissions particularly defined for use by the set of integration services.

The CMIS data model may include a feature called "secondary type" which defines named sets of properties that can be dynamically added to and removed from CMIS objects. Some enterprise content management (ECM) systems, such as Open Text Content Server (OTCS), have a feature called "categories" that can also define additional attributes that can be dynamically applied to or removed from a Content Server object. However, OTCS categories are primary type objects and can be created, modified, or deleted as regular objects. To resolve this conflict between CMIS secondary types and certain ECM features (e.g., OTCS categories), and allow the underlying ECM system (e.g., OTCS) to be fully CMIS-compliant, in some embodiments, certain components of the integration services are modified to leverage the CMIS secondary types. For example, a content server connector may be enhanced to support, in addition to CMIS documents and CMIS folders, CMIS primary types and CMIS secondary types. Additionally, new object types are added to an ECM extract, transform, and load (ETL) tool at the application tier. A non-limiting example of an ECM ETL tool can be Open Text Integration Center (OTIC).

Skilled artisans appreciate that OTIC may have an ECM abstract model of ECM objects and operations. OTIC may support ECM Document, ECM Folder, CS Category, CS Record Management (RM) Classification, and CS RM Hold. Adding a new ECM type in OTIC and performing operations on the new ECM type may require generalization based on a few examples of the ECM system. To this end, OTIC can be considered an ECM-dependent ETL tool. As a result of the changes made at the integration tier, disclosed herein, OTIC can be decoupled from the ECM and operate independently of an ECM system at the storage tier. For example, enhanced ECM connectors may map ECM-supported types to one of CMIS primary or secondary types. This means that as soon as a connector is able to support a new ECM type, OTIC (or the like) can immediately process the new ECM type without additional development on the OTIC side. This provides a technical effect of allowing OTIC to implement the CMIS model and support ECM Document, ECM Folder, CMIS Item, and CMIS Secondary types and operations on these types independent of the ECM system, making the improved OTIC an ECM-independent ETL tool.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 11 depicts a flow diagram illustrating one embodiment of a method for information integration across disparate information systems for non-search based applications;

FIG. 12 depicts a flow diagram illustrating one embodiment of a method for information integration across disparate information systems for search based applications;

FIG. 13 depicts a diagrammatic representation of a user interface of an example discovery application displaying search results provided by one embodiment of an information integration system disclosed herein;

FIGS. 17A-17B provide example types and operations of a repository-specific connector;

FIG. 18 depicts a diagrammatic representation of an example view of a graphical user interface of an integration services server;

FIGS. 22-23 depict diagrammatic representations of example views of a graphical user interface of a content server;

FIGS. 24 and 25A-25B depict diagrammatic representations of example views of a graphical user interface of an integration services server;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
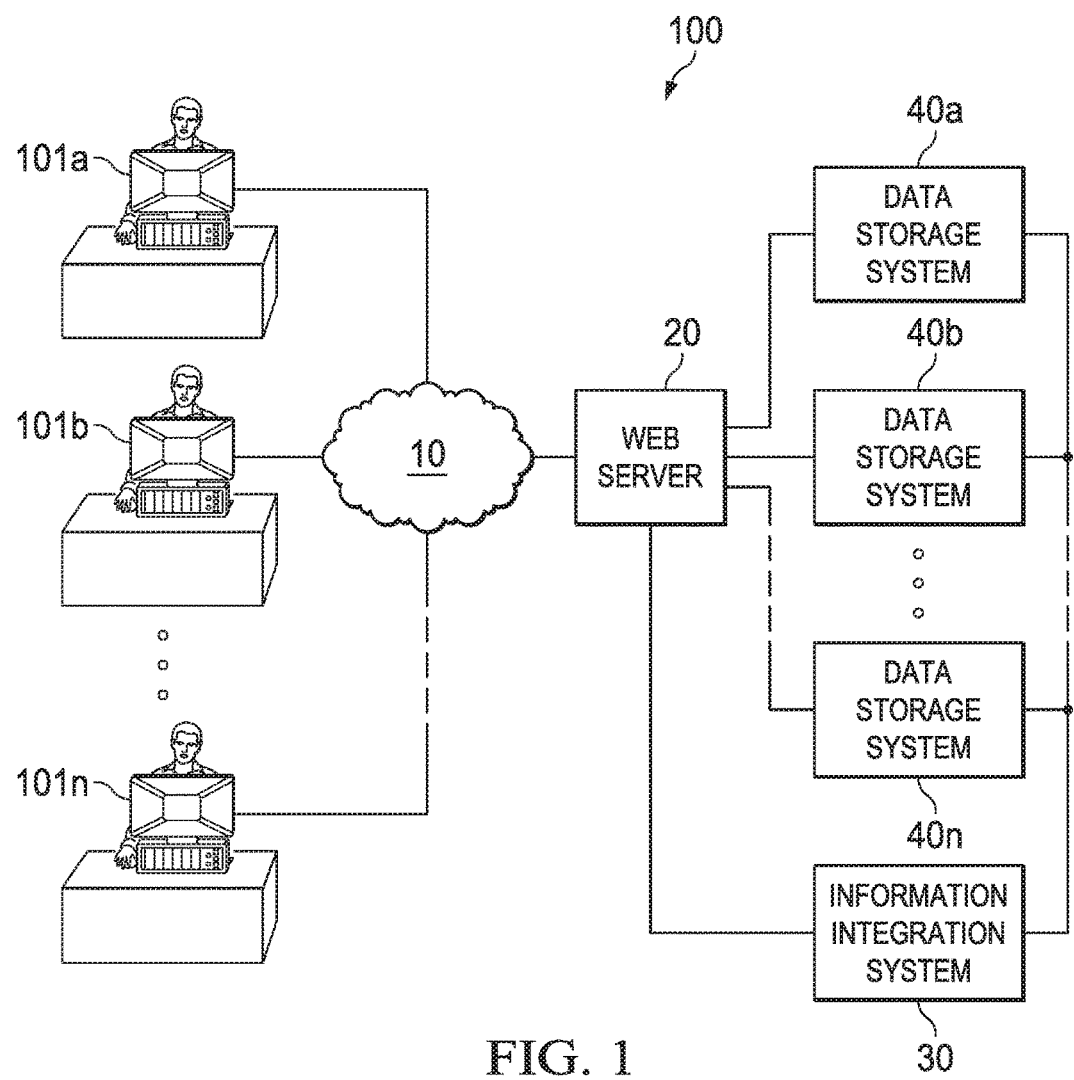
FIG. 1 depicts a diagrammatic representation of one example of a network environment in which embodiments disclosed herein can be implemented.
Figure 14:
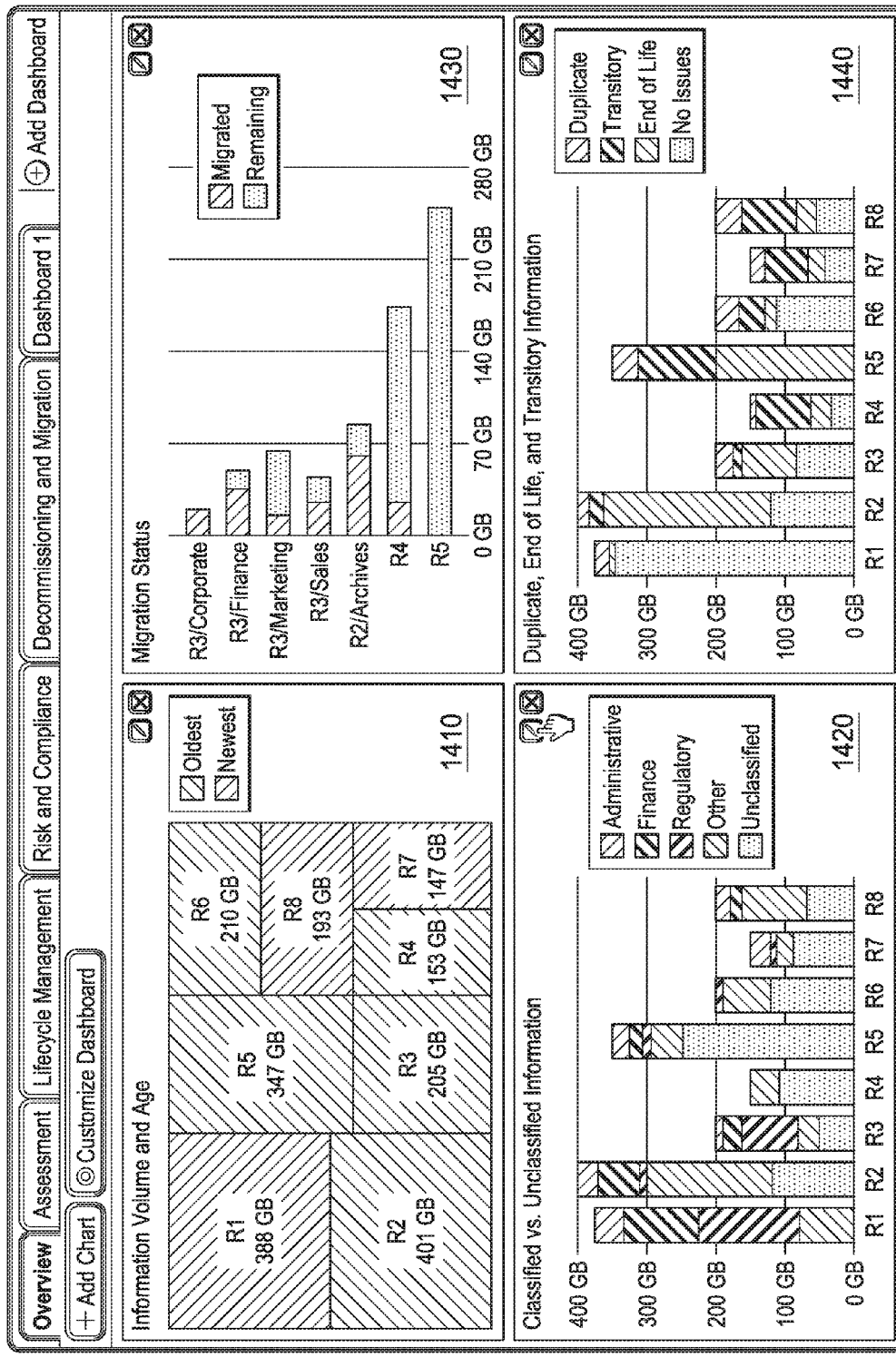
FIG. 14 depicts a diagrammatic representation of a user interface of an example lifecycle management application displaying a dashboard generated using an embodiment of an information integration system disclosed herein.

Before describing embodiments in detail, however, it may be helpful to provide an example of a network environment in which embodiments can be implemented. This is illustrated in FIG. 1. In this example, network environment 100 may include client devices 101a, 101b . . . 101n communicatively connected to web server 20 over network 10. Web server 20 may be communicatively connected to a plurality of information systems 40a, 40b . . . 40n directly or by way of information integration system 30. In this disclosure, information systems 40a, 40b . . . 40n may include backend systems such as data storage systems residing in a storage tier and described in more detail below. Information integration system 30 may reside on one or more server machines. Each of the client devices and server machines illustrated in FIG. 1 can be a data processing system, an example of which is shown in FIG. 14.

Example embodiments of an information integration system will now be described.

Figure 2:
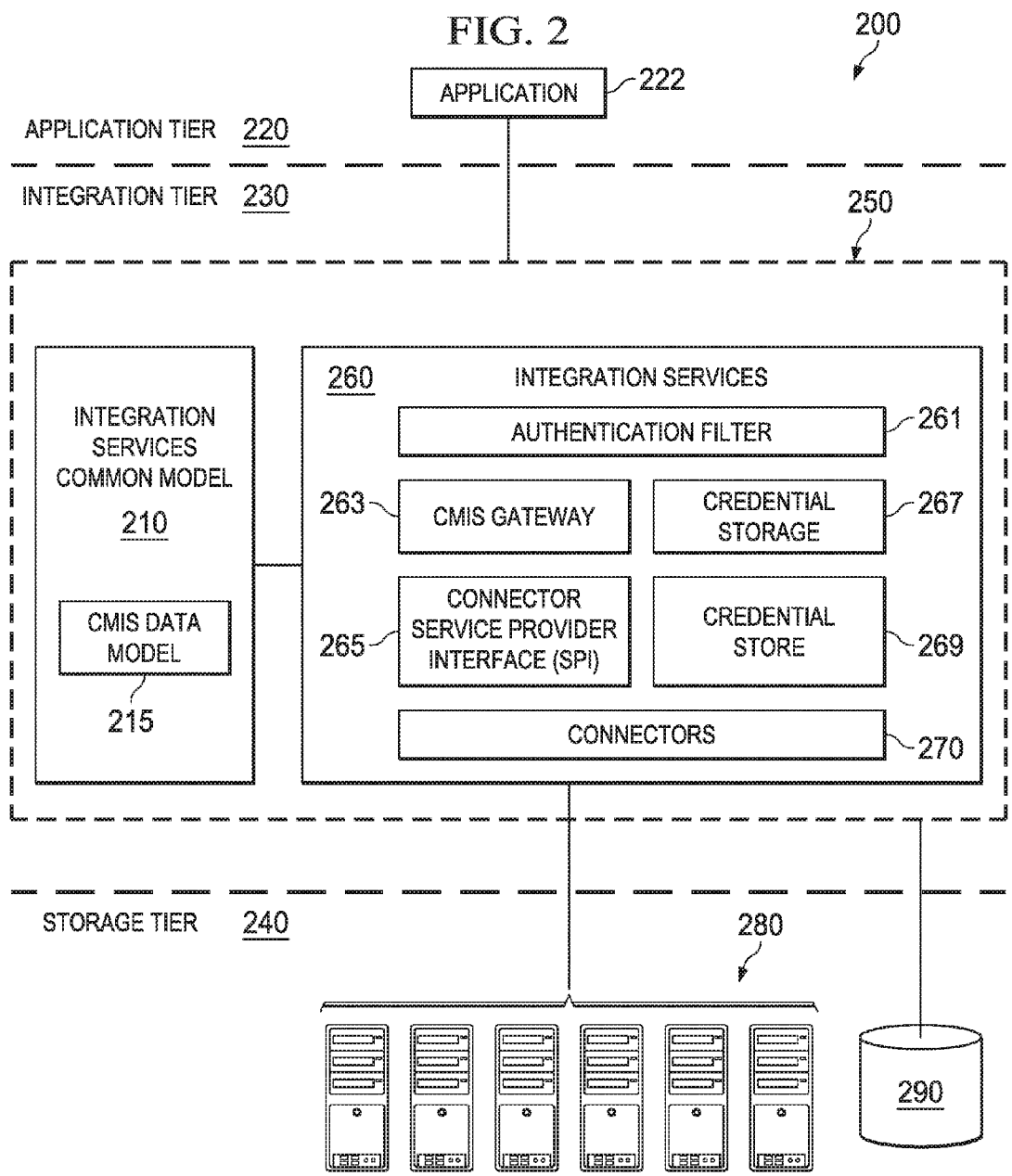
FIG. 2 depicts a diagrammatic representation of one embodiment of a system having a set of integration services for integrating data across disparate information systems.

FIG. 2 depicts a diagrammatic representation of one embodiment of a system having a set of integration services for integrating data across disparate information system. Architecturally, system 200 may include application tier 220, integration tier 230, and storage tier 240. Information integration system 30 shown in FIG. 1 may implement an embodiment of information integration system 200 shown in FIG. 2.

Storage tier 240 may comprise repositories 280 and database 290. Repositories 280 may include multiple disparate information systems. Data in such information systems may be formatted differently and/or structured using different data models. Examples of information systems can include various data storage systems and repositories such as document management systems, content management systems, content repositories, document repositories, content servers, document servers, etc. In this disclosure, these systems may be collectively referred to herein as backend systems. Database 290 may be communicatively connected to information integration server 250 and may contain data for use by information integration server 250. For example, database 290 may store configurations for connecting to the repositories 280. These configurations may include configuration parameters defined by service providers. In one embodiment, database 290 may be a relational database.

Application tier 220 may comprise a plurality of applications, including application 222. There can be various types of applications, including mobile applications, web based applications, and enterprise-class applications, at application tier 220. For discussion and examples of enterprise-class applications, readers are directed to U.S. patent application Ser. No. 13/939,946, filed Jul. 11, 2013, and entitled "SYSTEMS AND METHODS FOR IN-PLACE RECORDS MANAGEMENT AND CONTENT LIFE-CYCLE MANAGEMENT," which is incorporated herein by reference. As a non-limiting example, application 222 can be a client application called Open Text Integration Center (OTIC), which is discussed below.

Integration tier 230 may comprise information integration server 250. According to this disclosure, various applications may access data in backend systems through an information integration server in various ways. For example, an In-Place Records Management (RM) application (available from Open Text, headquartered in Waterloo, Ontario, Canada) may manage records "in-place" as they are stored in backend systems through an embodiment of an information integration server. As another example, a search application may search information across disparate backend systems by way of an embodiment of an information integration server. As yet another example, a browser may access information across disparate backend systems by way of an embodiment of an information integration server.

In the example of FIG. 2, information integration server 250 may include integration services 260. Integration services 260 may provide application 222 with synchronous access to backend systems 280 residing at storage tier 240.

In one embodiment, integration services 260 may include authentication filter (servlet component) 261, CMIS gateway (servlet component) 263, service provider interface (interface component) 265, credential storage (servlet component) 267, credential store (storage component) 269, and connectors (connector component) 270. Those skilled in the art will recognize that integration services 260 may be implemented in various ways. For example, one or more components of integration services 260 shown in FIG. 2 may be optional, as further described below. Furthermore, in some embodiments, integration services 260 may include one or more components not explicitly shown in FIG. 2.

Authentication filter 261 can be implemented in various ways. For example, in one embodiment, authentication filter 261 may implement a single sign-on (SSO) solution. Other access control solutions such as layering Hypertext Transfer Protocol Secure (HTTPS) on top of the secure sockets layer (SSL)/Transport Layer Security (TLS) protocol may also be possible. In some embodiments, authentication may be optional. For example, if application 222 is responsible for handling authentication or if authentication is not required in system 200, then authentication filter 261 may be optional.

Suppose authentication is required and a user of application 222 is authenticated using authentication filter 261, integration services 260 may operate to determine if the user already has a session on the requested information system at the backend. For example, referring to FIG. 1, user 101*a* may already have a session open with backend system 40*a* without going through information integration system 30. If the user already has a session on the requested information system at the backend, application 222 may call integration services 260 with a session identifier (ID) which is then stored in credential store 269 via credential storage 267. If the user does not have a session on the requested information system at the backend, integration services 260 may operate to check credential store 269 and, if the user is permitted to access the requested information system per information stored in credential store 269, cause CMIS gateway 263 to open a session on the requested information system (using an appropriate connector, explained below). User credentials stored in credential store 269 may be encrypted.

Before discussing CMIS gateway 263 in more detail, it might be helpful to discuss an open standard known as Content Management Interoperability Services (CM IS). CMIS defines an abstraction layer that allows different content management systems to inter-operate over the Internet using web protocols. Specifically, CMIS includes a set of services for adding and retrieving documents and provides a data model referred to as the CMIS data model. The CMIS data model covers typed files and folders with generic properties that can be set or read. The CMIS data model is based on common architectures of the backend systems. Consequently, CMIS does not define how a backend system can be mapped to the CMIS data model. Furthermore, these backend systems may have different expressions of the CMIS data model in which key-value pairs in the CMIS data model may be exposed differently from system to system.

To this end, CMIS gateway 263 may decouple the CMIS data model from disparate backend systems while allowing frontend applications which utilize the CMIS to access content stored in the disparate backend systems. As illustrated in FIG. 2, one way to decouple CMIS data model 215 from disparate information systems 280 is to overlay CMIS data model 215 with integration services (IS) common model 210. CMIS gateway 263 may maintain IS common model 210. IS common model 210 may overlay, integrate, augment, or otherwise utilize CMIS data model 215. CMIS gateway 263 may call one of connectors 270 to communicate with a particular information system 280 at storage tier 240. Connectors 270 may be configured or otherwise adapted to communicate with information systems 280. Service provider interface 265 may allow a new connector to be deployed into system 200. Examples of connectors 270 are described below with reference to FIGS. 3-5. An example of a method for adding a new connector to an information integration system is described below with reference to FIG. 6.

Figure 3:
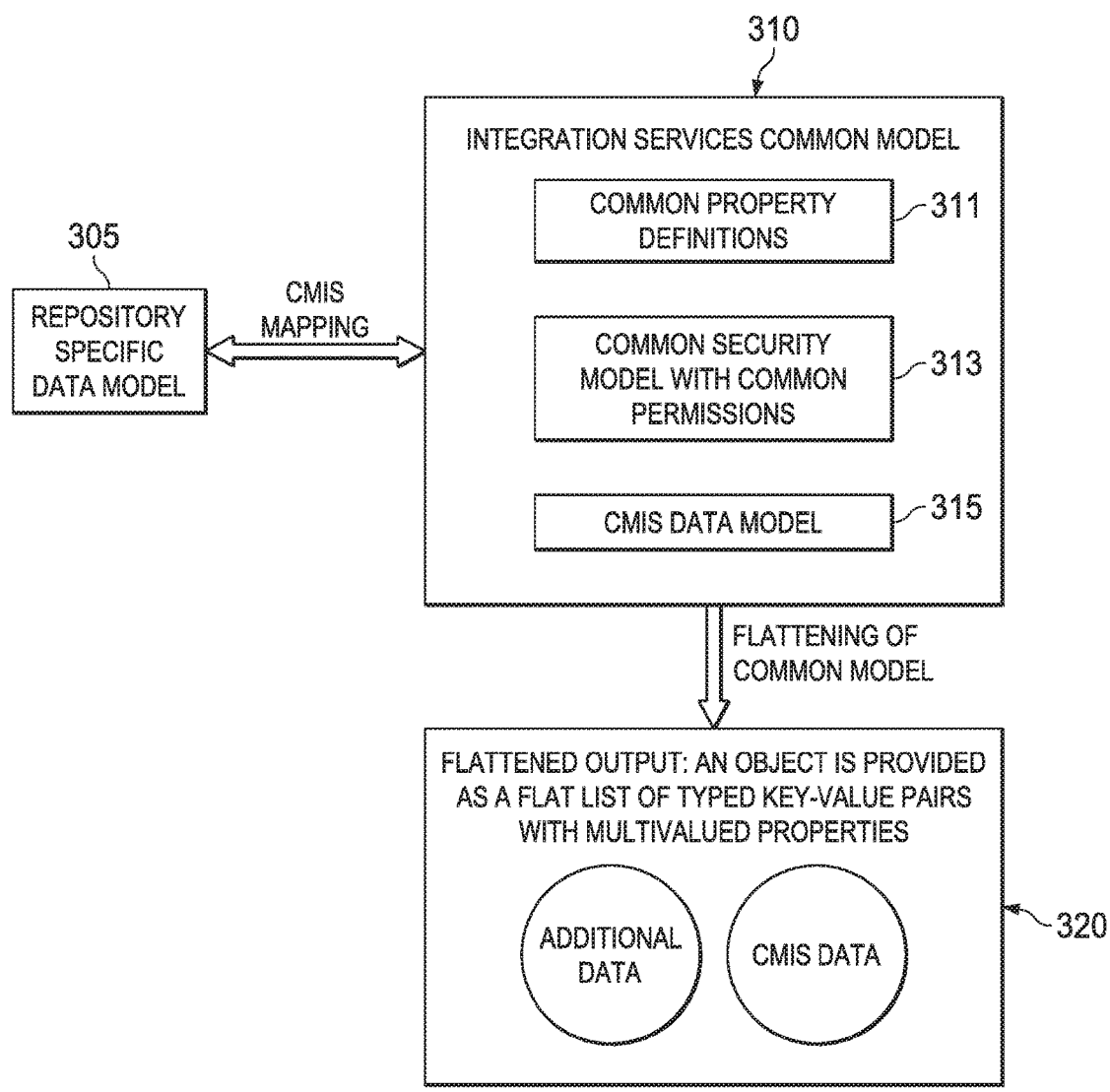
FIG. 3 depicts a diagrammatic representation of one embodiment of a common model utilized by a set of integration services for integrating data across disparate information systems.

FIG. 3 depicts a diagrammatic representation of how an information integration system may operate to integrate data across disparate information systems utilizing connectors and an IS common model. As described above, these disparate information systems may implement different data models. Referring to FIG. 3, in some embodiments, metadata stored in an information system according to repository specific data model 305 may be mapped to CMIS conventions conforming to CMIS data model 315 using connectors such as connectors 270 shown in FIG. 2, connectors 465, 475 shown in FIG. 4, or connectors 770 shown in FIG. 7.

As illustrated in FIG. 3, this CMIS mapping can be bi-directional. That is, in some embodiments, an information integration system may be configured to provide a two-way translation for a repository data model and the CMIS data model. In some embodiments, this two-way translation can be characterized by: 1) repository objects are unambiguously translated into instances of CMIS types; and 2) instantiation of CMIS types result in unambiguous instantiation of repository objects.

To provide for this bi-directional CMIS mapping, a connector may be configured with several Java classes, including a type manager class, for interfacing with a specific information system at the backend, mapping the data model used by the specific information system at the backend to the CMIS data model maintained by the CMIS gateway, creating types appropriate for the specific information system, and exposing the types through the CMIS gateway to the application tier. This kind of connectors may be preconfigured as part of the information integration system. Post-installation of the information integration system, extensible connectors may be added, as explained below. Extensible connectors may not create types on the information systems at the backend, although they can still create instances of types and expose those types.

An example type can be a document type that defines a document guaranteed to have an integer in its metadata and the integer is some file number. Suppose the file number is guaranteed to have a certain length and fit into two bytes. Also, suppose a second document type defines a different file number that fits into four bytes. In an information system, these types maybe called type 1 and type 2 or type short and type long. These types are created and defined in the same information system. A repository connector configured for this information system may create type 1 or type 2 as well as instances thereof, while an extensible connector may create instances of type 1 or type 2. A repository connector may be created, configured, and installed as part of the information integration system. In this case, the repository connector would have the knowledge as to the length of numbers that are used by the two types and how to map between the lengths of numbers to be exposed. An extensible connector may be configured and deployed by a service provider into the information integration system post-installation using a connector service provider interface such as connector service provider interface (SPI) 265 shown in FIG. 2. In this case, the extensible connector is not required to have the knowledge to create the types. Rather, it creates instances of the types and exposes them accordingly.

These connectors are embeddable and available via integration services described herein. They are responsible for using common property definitions and common permissions such as common property definitions 311 and common permissions 313 shown in FIG. 3. Common property definitions 311 and common permissions 313 may be uniquely defined and utilized by an information integration system such as system 200 shown in FIG. 2. Specifically, common permissions may be particularly defined for use by integration services such as integration services 260 shown in FIG. 2. In one embodiment, common permissions 313 may comprise access control list (ACL) permissions.

As described above, the CMIS data model may cover typed files and folders with generic properties that can be set or read. Although data exposed by CMIS data model 315 may not fully cover the types of data held according to repository specific data model 305 in the given information system, in some embodiments, data exposed by CMIS data model 315 (referred to as CMIS data in FIG. 3) may cover a set of data types sufficient for mapping data held in a given information system. A model mapping operation (e.g., an operation that maps data in repository specific data model 305 to common model 310) using a connector may unambiguously translate a repository object into a list of CMIS typed key-value pairs, resulting in a "flattened" output. CMIS have items that have metadata, items that have metadata and a content stream, items that have metadata and children, policies and relationships, and so on. The metadata in those cases is flattened into multivalued properties that have, for instance, names, types, integers, and strings. As illustrated in FIG. 3, flattened output 320 may include the CMIS data (CMIS typed key-value pairs) and some additional data (key-value pairs) originated from additional analysis. Such additional data may not map to instances of data in the CMIS data model.

CMIS has the notion of property definitions such as name, value, and type. For example, "Filename" in a repository specific data model may map to CMIS Object "cmis:localName." Common model 310 includes common property definitions 311 that are far more comprehensive. In some embodiments, these are referred to as "common keys" or "keys" and may include, but are not restricted, to:
DocumentID
Name
Description
Type
Subject
Authors
Created
Modified
CreatedBy
OwnedBy
FileType
MimeType
Size
VersionMajor
VersionMinor
VersionLabel
NumberVersions
FileName In this way, semantically equivalent attributes or metadata fields used by disparate information systems at the backend can be mapped to the same common key used by common model 310.

For example, suppose common model 310 employs a key "author" and repository specific data models employ different attributes or metadata fields such as "author," "author name," "author_name," "AuthorName," "Name_Author," etc. Through CMIS mapping, these semantically equivalent attributes or metadata fields may all be mapped to "author" and indexed accordingly. Likewise, when searching disparate information systems at the backend, "author" may be mapped to "author," "author name," "author_name," "AuthorName," "Name_Author," etc. used by disparate information systems. Accordingly, when a search is performed to look for documents by a certain author named "John Smith," all documents authored by "John Smith" in the information systems may be found, even though different information systems may associate this name value "John Smith" with the documents using different attributes or metadata fields.

Connectors are an important part of this bi-directional CMIS mapping. When a service provider develops a connector, they have to develop the CMIS portion described above and an authorization portion and a principals service portion described below. The authorization portion and the principals service portion are completely outside of the conventional CMIS data model and are used for the common security model disclosed herein. While the CMIS allows access to an ACL in a typical content management system, if a service provider wants to use the common security model, they have to implement special common model permissions used by the search API. Note that the common security model also uses ACL permissions, although it supports additional common permissions.

A data collector such as data collector 473 described below with reference to FIG. 4 or data collector 773 described below with reference to FIG. 7 can be configured to supply ACLs for objects. In some embodiments, ACLs are defined as in the CMIS specification as a list of access control entries (ACEs) where each ACE contains a principal and a permission. A principals service reports principals that might show up in the ACEs inside of an ACL. During a synchronization operation, permissions may be modified by updating all the ACLs for the information systems at the backend.

In some embodiments, the common security model may be considered a CMIS ACL compatible permissions model such that a single source of connectors from the connector framework described above can be the CMIS based connectors.

In some embodiments, a data collector may support a list of named "read" and/or "denyRead" permissions such as the following:
hDenyRead
hRead
mDenyRead
mRead
lDenyRead
lRead In this case, "h" represents "high priority," "m" represents "medium priority," and "l" represents "low priority." If a user's principals match the principal in the higher level of priority, then that will determine their permissions. Otherwise, it will be determined by the next priority level. At each level, denies are prioritized over allows. The common permissions are logically evaluated in order of priorities defined above.

As an example, suppose an information system at the backend defines the following order in which repository specific permissions are to be evaluated: Explicit Deny, Explicit Allow, and Inherited Permissions (either allow or deny) from ancestors in a containment hierarchy. Inherited permissions are permissions attached to a folder where the file is in.

One embodiment of a connector may map these permissions to the common security model disclosed herein as follows:
Explicit Deny→hDenyRead;
Explicit Allow→hAllowRead;
Implicit Allows all go into hAllowRead until the first Deny is hit, then it is put into mDenyRead until the next Allow is hit, which goes into mAllowRead and so on . . . .

Even though their inheritance chain allows Reads to happen before Denys because they just follow the inheritance chain in order, the connector will always follow the common security model's definition of order (per the logical evaluation of priorities defined above). From this perspective, the connector is transforming the permission evaluation from one logical order to another. To do that, the connector follows the inheritance chain defined by the information system and whenever there is a switch from Allow to Deny, the connector hops to the next available Deny according to the common security model's definition of order.

Another useful function of connectors disclosed herein is to map filenames. A connector can map a filename used in the information integration system to a CMIS object name (e.g., LocalName).

Two example representations of the ACLs required by the unified index are as follows.

These are in the "flattened" form sent to the ingestion pipeline.

Representation 1

```
<ACLs>
  <hDenyRead>
    encoded(principal) encoded(principal) encoded(principal)
  </hDenyRead>
  <hRead>
    encoded(principal) encoded(principal) encoded(principal)
  </hRead>
  <mDenyRead>
    encoded(principal) encoded(principal) encoded(principal)
  </mDenyRead>
  <mRead>
    encoded(principal) encoded(principal) encoded(principal)
  </mRead>
  <lDenyRead>
    encoded(principal) encoded(principal) encoded(principal)
  </lDenyRead>
  <lRead>
    encoded(principal) encoded(principal) encoded(principal)
  </lRead>
</ACLs>
```

Representation 2

```
<ACLs>
  <hDenyRead>encoded(principal1)</hDenyRead>
  <hDenyRead>encoded(principal2)</hDenyRead>
  <hDenyRead>encoded(principal3)</hDenyRead>
  <hRead>encoded(principal4)</hRead>
  <hRead>encoded(principal5)</hRead>
  <hRead>encoded(principal6)</hRead>
  <mDenyRead>encoded(principal)</mDenyRead>
  <mDenyRead>encoded(principal)</mDenyRead>
  <mRead>encoded(principal)</mRead>
  <mRead>encoded(principal)</mRead>
  <lDenyRead>encoded(principal)</lDenyRead>
  <lDenyRead>encoded(principal)</lDenyRead>
  <lDenyRead>encoded(principal)</lDenyRead>
```

-continued

```
  <lRead>encoded(principal)</lRead>
  <lRead>encoded(principal)</lRead>
  <lRead>encoded(principal)</lRead>
</ACLs>
```

As those skilled in the art will appreciate, depending upon the representation of the ACLs used by the indexing system, different encoding mechanisms may be used to commonly encode the principals for the principals service. Different information systems may encode their principals differently. For example, a user's principal may be encoded as "SYSTEM 16344 1003" in a content server and as "#AUTHENTICATED-USERS#" in a file management system. They are commonly encoded for the principals service.

Documents which can be seen by all users on a system may be treated by constructing a repository specific principal representing all users. The principals service may ensure that every user on an information system has a principal (e.g., principal="WORLD"). The data collector may ensure that every document with these permissions has the principal in the correct permissions level.

An information system that supports super users may implement the principals service by constructing a repository specific principal representing super users (e.g., principal="SUPERUSER"). The principals service may ensure that only super users have this principal, and the data collector may ensure that every document has a super user principal associated with the correct permissions level.

The principals service uses common permissions mapped by the connectors. Depending upon implementation, different types of connectors may be used by different components of an information integration system. FIG. 4 provides an example of an information integration system that may employ different types of connectors.

Figure 4:
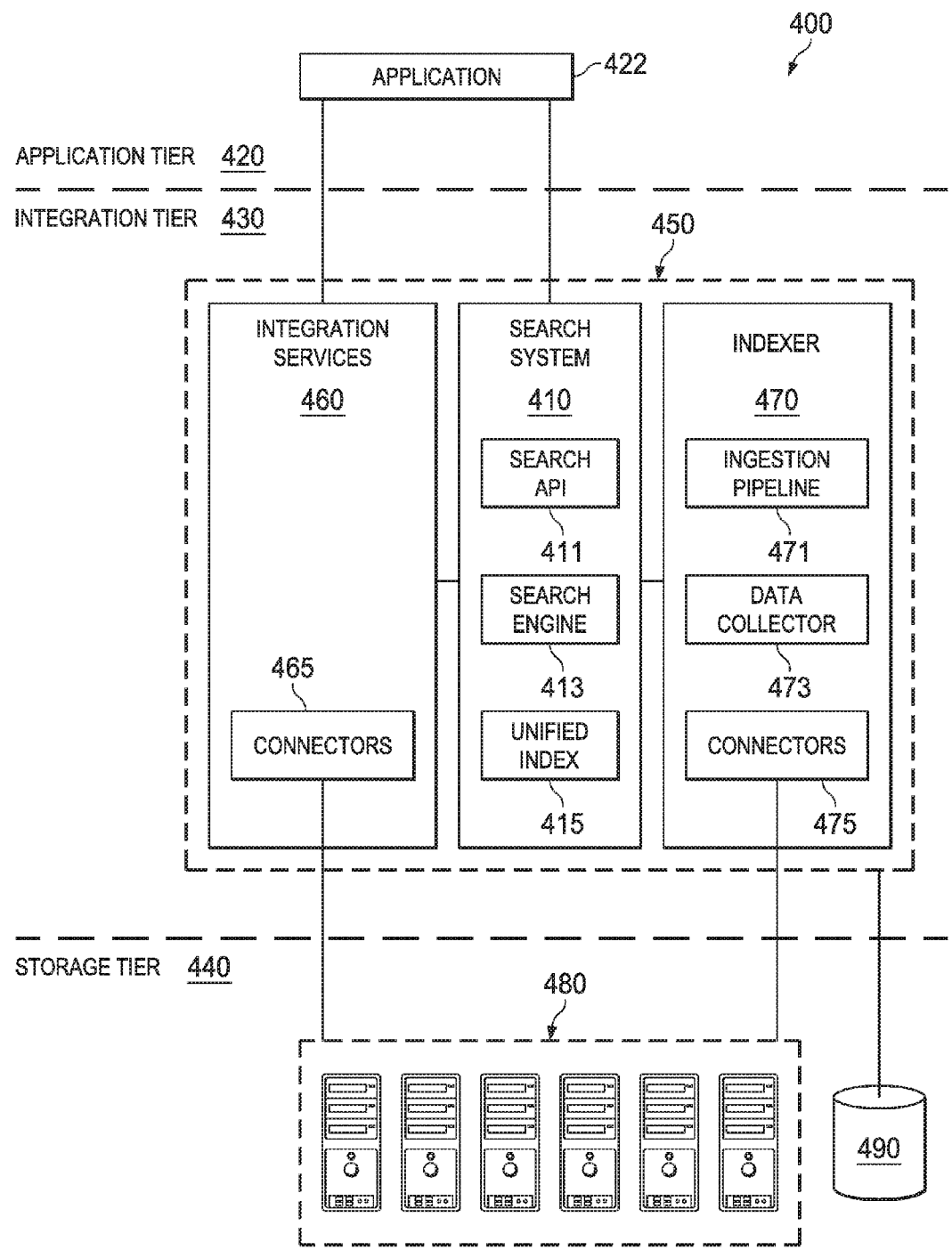
FIG. 4 depicts a diagrammatic representation of one embodiment of an information integration system through which a search application can access objects in disparate information systems.

In the example of FIG. 4, information integration system 400 may include application tier 420 having application 422, integration tier 430 having information integration server 450, and storage tier 440 having information systems 480 and database 490. Database 490 may be the same or similar to database 290 shown in FIG. 2. Architecturally, system 400 may be the same or similar to system 200 shown in FIG. 2.

Application 422 can be a search application. A method of implementing information integration system 400 in a network computing environment may include installing information integration server 450 which includes integration services 460. In some embodiments, integration services 460 may include components the same as or similar to those described above with regard to integration services 260. In this example, integration services 460 include connectors 465. Connectors 465 can be the same as, similar to, or different from connectors 270 described above with reference to FIG. 2. In one embodiment, each of connectors 465 is particularly configured for communicating with a specific information system of information systems 480.

Information integration server 450 may further include search system 410 and indexer 470. Search system 410 may comprise search API 411, search engine 413, and unified index 415. Indexer 470 may comprise ingestion pipeline 471, data collector 473, and connectors 475. These components will be further described below.

In some embodiments, the method may further include running data collector 473 to obtain data (e.g., document metadata) from disparate information systems 480 for indexing by search system 410. Data collector 473 may utilize connectors 475 to communicate with information systems 480. In some embodiments, connectors 475 can be the same as, similar to, or different from connectors 270 described above with reference to FIG. 2. For example, in one embodiment, each connector 475 may be particularly configured for a specific information system of information systems 480 such that data mined from the specific information system can be mapped to the CMIS conventions as explained above.

Data collected by data collector 473 may be provided to ingestion pipeline 471 for processing. For example, a document may be processed through a flow involving several components such as a document extractor, a path processor, a field mapper, a file type normalizer, a detagger, a summarizer, an indexer, and a cleaner in order to extract data that can be used by search engine 413 to build unified index 415. Other implementations of indexer 470 may also be possible.

Indexer 470 may feed the processed data to search system 410 to build unified index 415. Search engine 413 may use unified index 415 and may support faceted search (explained below). Other implementations of search system 410 may also be possible.

After installation of integration services 460 and as soon as search system 410 begins to build unified index 415, application 422 may, through integrated services 460 of information integration server 450 at integration tier 430, have access to some indexed data. This allows application 422 to search and synchronize access to information systems 480 at storage tier 440 even before unified index 415 is completely built.

On an ongoing basis, indexer 470 may be used to synchronize with information systems 480 at the backend and keep unified index 415 up-to-date. At this point, application 422 is fully configured. For example, a user may now perform a faceted search utilizing application 422.

Faceted search refers to a technique for accessing organized information, combining text search with navigational search using a hierarchy structure. For example, information stored in a repository may be augmented with facets corresponding to properties of data elements such as author, descriptor, format, language, etc.

A facetted search module may comprise a search application programming interface (API) and a search interface configured to allow a user to enter search text into a text box. As an example, application 422 may run an instance of a search interface on a client device associated with the user. The user input text is communicated to search system 410 via search API 411.

Search API 411 may, in turn, return search results to the user via the search interface running in application 422. The search interface may present the organized search results. For example, the search results may be shown in facets or categories. Each of the categories may be shown with a number of hits (counts). The user can refine the search results by browsing or navigating down a path that begins with one of the categories. Each time a facet is selected, a new search query is automatically generated and passed down through the search interface and search API 411 to search engine 413 to begin a new, narrower search. The new search results are returned and presented to the user in a similar manner. This process can be repeated until the user enters a new search query, ends the session, closes application 422, or otherwise terminates the process. Other implementations of search engine 413 may also be possible.

In one embodiment, application 422 may, via the search interface, present a page with a tree map view of the search result to the user. As an example, the tree map can be an automatically generated diagram that lays out items of information in information systems 480 that match the search query or queries.

Even though objects referenced in the search results may reside in disparate information systems at the backend, a user is able to access them through integration services at the integration tier regardless of where the data actually resides. This is facilitated by mapping the data to the common model as described above. In one embodiment, the mapping can be hard coded and realized on-the-fly through integration services. As an example, the mapping may include specifying a document type in a connector such as connector 475 for indexer 470, querying a particular information system for documents of the specified document type, collecting the data returned by the information system, and providing the data to the search application. In one embodiment, connectors 475 may comprise a set of proprietary drivers and scripting and data mapping structure built over the drivers. Other implementations are also possible.

The mapping may be synchronized across the integration tier. Specifically, data type definitions may be synchronized across connectors at the integration tier. Referring to FIG. 4, in some embodiments, this can be realized by hard coding connectors 465 and connectors 475, programmatically ensuring that the data type definitions are synchronized according to a common model (e.g., IS common model 310 described above). The synchronized mapping allows systems at the integration tier to work together.

As illustrated in FIG. 4, in some embodiments, some components of an information integration system such as integration services 460 and indexer 470 may employ different types of connectors to communicate with disparate information systems 480. In such embodiments, each connector 465 is configured for or otherwise adapted to a particular information system 480 and each connector 465 is configured for or otherwise adapted to a particular information system 480. When a new repository is added, then, this may mean that a new connector 465 for integration services 460 is to be configured for or otherwise adapted to communicate with the new repository and a new connector 475 for indexer 470 is to be configured for or otherwise adapted to the same repository.

Figure 5:
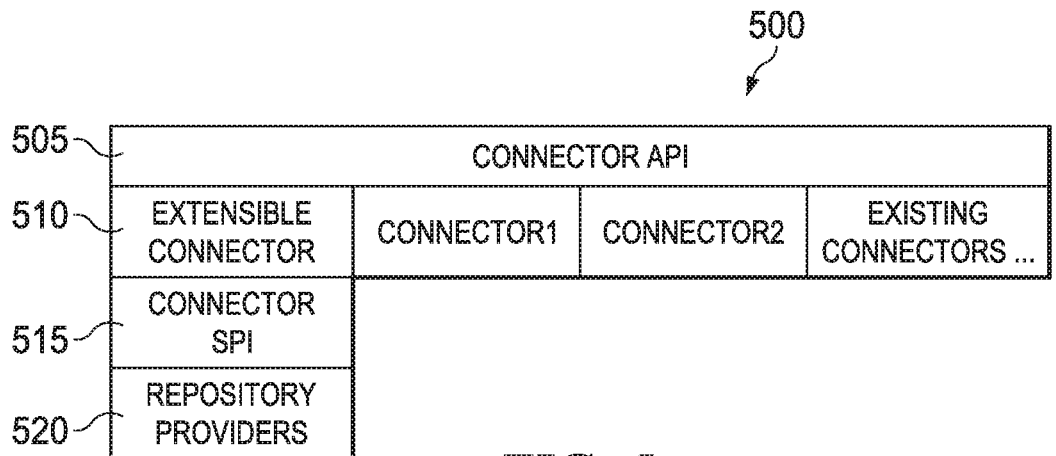
FIG. 5 depicts a diagrammatic representation of one embodiment of a set of connectors configured for integrating data stored in disparate information systems according to a common model utilized by a set of integration services.

In some embodiments, some components of an information integration system may employ a connector framework to communicate with disparate information systems 480. One example of a connector framework is illustrated in FIG. 5.

In some embodiments, connector framework 500 may comprise connector API 505 and connectors 510. Connectors 510 may include preconfigured connectors such as Connector1 for a first information system, Connector2 for a second information system, and various existing connectors for various information systems at the backend. These preconfigured connectors may be referred to as repository connectors as they are particularly configured for and can communicate directly with respective repositories.

Connectors 510 may also include extensible connectors. Extensible connectors may be created, configured, and deployed into connector framework 500 and usable by an information integration system post-installation (e.g., an information integration system that is operational in an enterprise computing environment). An example of this process is described below with reference to FIG. 6.

A connector service provider interface (SPI) (e.g., connector SPI 515) allows a service provider (e.g., repository providers 520) to deploy and configure connectors used by the information integration system to communicate with a particular backend system (repository). In some embodiments, a connector SPI may comprise a set of interfaces that a service provider is to implement if they wish to add a connector to the information integration system. To create a connector, an SPI JAR file may be provided as an example which has the classes that can be used to create the connector. The service provider will create a connector using the classes provided in the JAR file, debug as usual, deploy the connector into the information integration system and use the connector SPI to configure the connector. Depending upon the backend system, types may be provided by the service provider.

Figure 6:
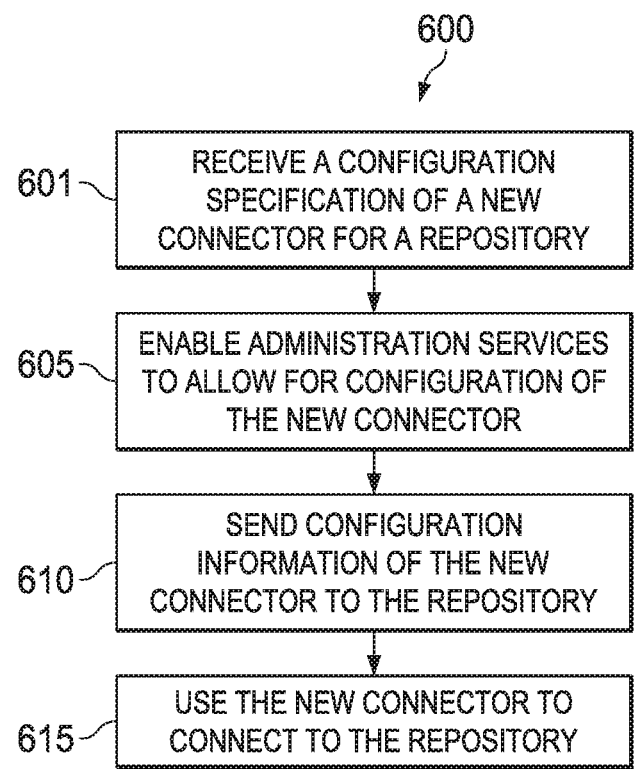
FIG. 6 depicts a flow diagram illustrating one embodiment of a method of dynamically creating a new connector in an information integration system post-installation.

Referring to FIG. 6, at step 601, process 600 may receive or retrieve a configuration specification of a new connector for a repository from a repository provider. The configuration specification may contain types of configuration parameters for their new connector. At step 605, process 600 may create necessary entries in a database (e.g., database 290 shown in FIG. 2, database 490 shown in FIG. 4, database 790 shown in FIG. 7, or database 990 shown in FIG. 9) based on the configuration specification and enable an administrator for the repository to configure (using a connector SPI) the new connector for the specific repository. For instance, SPI configuration parameters as well as whatever information that connector needs may be stored in the database.

The new connector may be configured for a set of integration services such as CMIS services, principals service, common model ACL service, authorization service, etc., some of which may be optional. In some embodiments, the new connector may also be configured to use the common property definitions if the repository provider wishes to participate in a unified index provided by the information integration system. In some embodiments, the new connector may also be configured to use the common model permissions if the repository provider wishes to implement the principals service.

The configured connector may provide a connection factory and service methods particular to the repository. The connection factory may reside at the repository level and may be used to create a connection which is managed by the information integration system (and thus is referred to as a managed connection). Additionally, the connection factory may process credentials for accessing the repository.

Once the service provider has configured the connection to their specific repository, at step 610, process 600 may send the configuration information of the new connector to the specific repository which encapsulates the CMIS services. When needed, at step 615, the new connector can be used to create a managed connection to the repository. For example, when there is a service call for an object, an instance of the connector may be called with an appropriate object ID to get the object from the repository. In one embodiment, the integration services may be restarted before the newly configured connector can be used.

For extensible connectors created post-installation, types are created on the remote systems at the backend. These new connectors can expose objects of a type thus created in a consistent way, allowing an object of that type to be created or viewed.

The flexible, adaptable, and efficient connector framework described above can eliminate the need to configure and employ different types of connectors for use by different components of an information integration system to communicate with the same information system at the backend. One example of an information integration system having such a connector framework is illustrated in FIG. 7.

Figure 7:
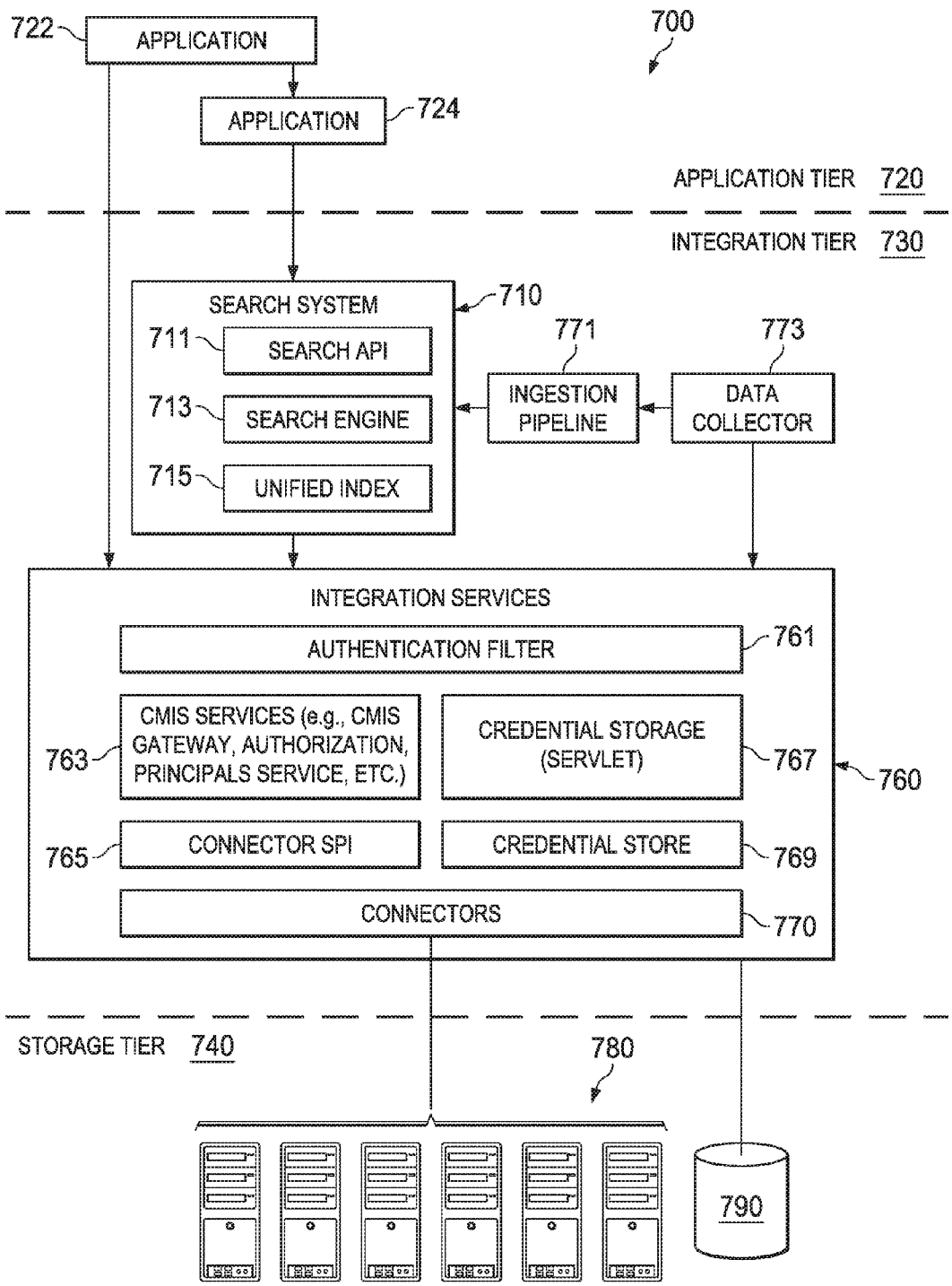
FIG. 7 depicts a diagrammatic representation of one embodiment of an information integration system having a set of connectors through which a data collector can collect data from disparate information systems and through which a search system can search data across the disparate information systems.

In the example of FIG. 7, system 700 may include application tier 720, integration tier 730, and storage tier 740. Application tier 720 may have applications 722 and 724. Application 722 may be a non-search based application and communicate directly with integration services 760. Application 724 may be a search based application and communicate directly with search system 710 which utilizes integration services 760. Integration tier 730 may have integration services 760, search system 710, ingestion pipeline 771, and data collector 773. Storage tier 740 may have information systems 780 and database 790. As illustrated in FIG. 7, non-search based application 722 may utilize search based application 724 to search disparate information systems 780.

Some components of system 700 such as search API, search engine 713, unified index 715, ingestion pipeline 711, and data collector 773 may be the same or similar to those described above with reference to system 400 shown in FIG. 4. Some components of system 700 such as authentication filter 761, CMIS services 763, connector SPI 765, credential storage (servlet) 767, and credential store 769 may be the same or similar to those described above with reference to system 200 shown in FIG. 2. Architecturally, however, system 700 is different from system 200 and system 400 in that integration services 760 reside between search system 710 and information systems 780 and also between data collector 773 and information systems 780.

Specifically, data collector 773 can collect data from disparate information systems 780 using connectors 770 and search system 710 can search data across disparate information systems 480 also using connectors 770. The connector framework of integration services 760 handles all the complexities in dealing with disparate information systems 780. Thus, data collector 773 does not need to know how to connect to information systems 780 or how to map all their repository formats to the format ingestion pipeline 771 needs. Moreover, as described above, extensible connectors can be readily created, configured, and deployed into the connector framework of integration services 760. The extensible connectors, along with any preconfigured connectors, can provide managed connections for system 700 to communicate with disparate information systems 780. Thus, although they could, there is no need for data collector 773 and search system 710 to use different kinds of connectors to communicate with the same repository at the backend.

As described above, a connector may be configured for a set of integration services such as CMIS services, principals service, common model ACL service, authorization service, etc., some of which may be optional. Thus, embodiments of connectors disclosed herein may vary from implementation to implementation, although their principle functions (e.g., bi-directional CMIS mapping, providing managed connections, etc.) remain the same.

Some example integration services will now be described with reference to FIG. 8.

Figure 8:
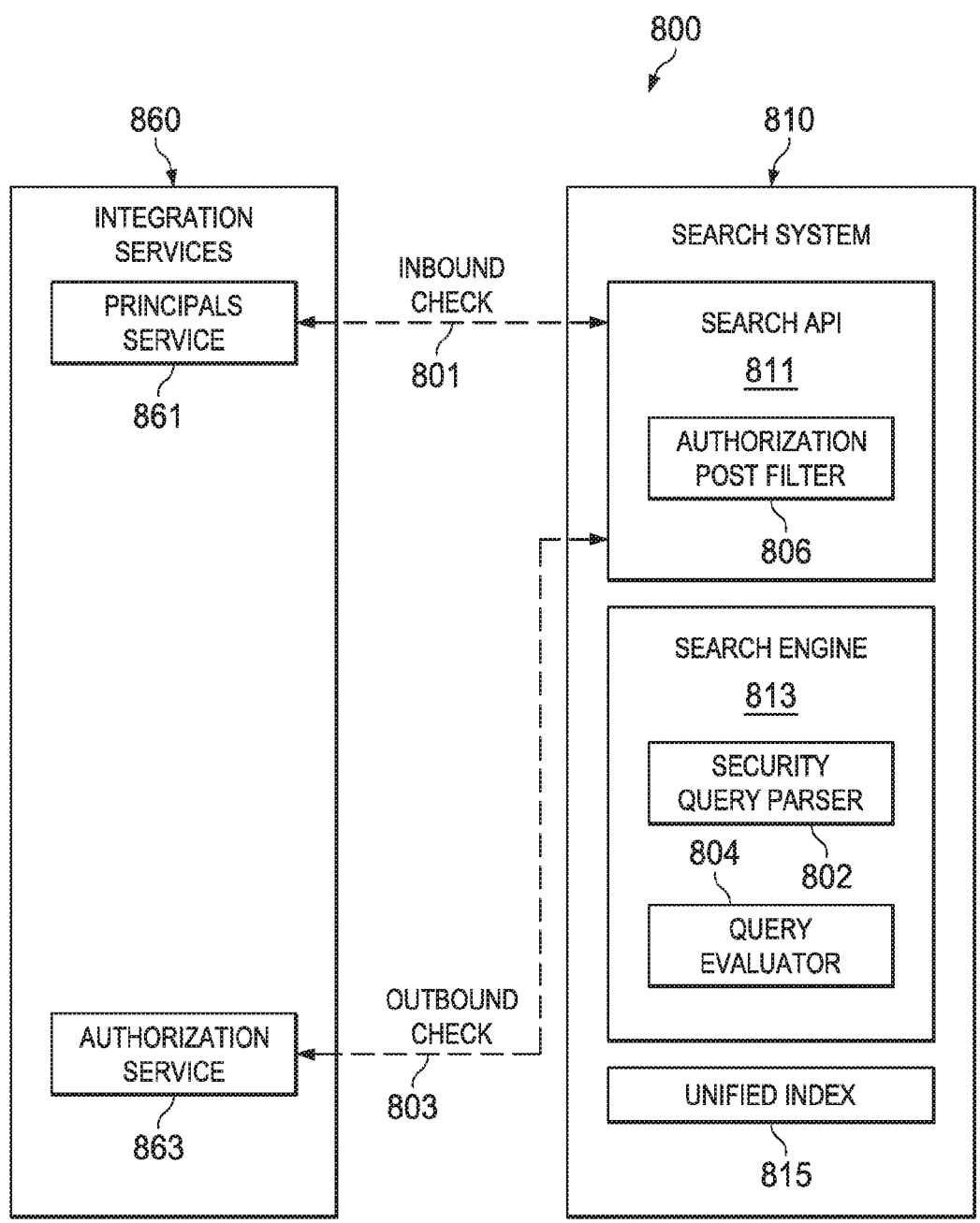
FIG. 8 depicts a diagrammatic representation illustrating example operations of an information integration system having a set of integration services and a search system according to some embodiments.

FIG. 8 depicts a diagrammatic representation illustrating example operations of an information integration system having a set of integration services and a search system according to some embodiments. In this example, information integration system 800 may comprise integration services 860 and search system 810. Information integration system 800 may include additional components such those described above with reference to FIGS. 2, 4, and/or 7.

Integration services 860 may comprise principals service 861 and authorization service 863. Search system 810 may comprise search API 811, search engine 813, and unified index 815. Search API 811 may comprise authorization post filter 806. Search engine 813 may comprise security query parser 802 and query evaluator 804. To facilitate principals service 861 and authorization service 863 and use unified index 815, connectors in system 800 would be configured to use the common property definitions and the common model permissions (e.g., common property definitions 311 and common permissions 313 shown in FIG. 3) described above.

In some embodiments, an information system at the backend may be configured for "early binding," "late binding," or "early followed by late binding." Early binding of permissions is done by looking up the user's principals at query time and modifying the query to return only results with correct permissions. The query is modified to include the union of the user's principals from all repositories being searched. A principals service in the integration services can provide the principals for a user in response to a service call. This is further explained below.

Referring again to FIG. 3, common security model 313 in IS common model 310 represents one of four security models supported by embodiments of an information integration system disclosed herein. Specifically, an information integration system can support a first security model configured for performing an inbound check at query time ("early binding"), a second security model configured for performing an outbound check after a search is done ("late binding"), a third security model configured for performing an inbound check and an outbound check after a search is done ("early followed by late binding," and a fourth security model where no check is performed (which, in one embodiment, common permissions may be defined but not used). Depending upon system configuration (by an administrator), any one of these security models may be implemented at configuration time. For example, the late binding can be an option for repositories that use non-CMIS based permission models.

In the first security model, the permission information associated with group identifiers is also indexed. Referring to FIG. 8, in response to a query from a user received at search system 810, search API 811 may call principals service 861 to find out with what principal(s) this user is associated (or of which group the user is a member) and call search engine 813 to modify (via security query parser 802) a query and determine (via query evaluator 804) to find out what that user can see per their association with the principal (s) based on permission information in unified index 815. This filters the requested search at query time (and hence "inbound"), rather than after the query is performed and then integration services 860 review the search results (e.g., page results) before sending them to the user requesting the search (outbound).

More specifically, security query parser 802 may augment the query with the principals for the user. Query evaluator 804 may evaluate the permissions as part of query evaluation. These permissions are common permissions. As described above, common permissions are logically evaluated in order of priorities defined in the common security model. Security query parser 802 may translate or modify the query into a complex Boolean to support evaluation by query evaluator 804.

As an example, a single call to a principals service may be as follows:

GET /v1/user/principals?repoid=,repoid=,

This returns the state of the information systems at the backend (e.g., a first repository "repo1" and a second repository "repo2" and all of the principals assigned to the user in those information systems:

{state: {repo1: ok, repo2: unreliable}, principals: [repo1_encoded(systemprincipal1), repo1_encoded(systemprincipal2), repo2_encoded(systemprincipal)]}

In this case, the state is one of the following:
ok—the results from this repository can be used
unreliable—this repository is not available to return principals
notSupported—this repository cannot be configured for early binding The GET principals call is used to construct the query at query time. For it to be fast, caching can be used.

Depending upon the interaction between the configuration of the repository and the state of the repository returned by the GET principals call, the query is modified in different ways. One example is provided in the table below:

| State of repository from principals service | Configuration of Repo in Search API | | |
|---|---|---|---|
| | Early binding | Late binding | Early followed by Late |
| Ok | Include results from repository | Include results from repository | Include results from repository |
| Unreliable | Do not include results from repository | Include results from repository | Include results from repository |
| notSupported | Do not include results from repository | Include results from repository | Include results from repository |

To illustrate, suppose a GET Principals call returns the following:

{state: {repo1: ok, repo2: unreliable}, principals: [repo1_jimbob, repo1_group1]}

Assume that a search API in this case is configured to treat both information systems "repo1" and "repo2" as early binding. The query may be modified to include (AND) the following filter:

((lallow:repo1_jimbob OR lallow:repo1_group1) AND NOT (hdenyRead:repo1_jimbob OR hdenyRead:repo1_group1) AND NOT (mdenyRead:repo1_jimbob OR mDenyRead:repo1_group1) AND NOT (lDenyRead:repo1_jimbob OR lDenyRead:repo1_group1) ) OR ((mRead:repo1_jimbob OR mRead:repo1_group1) AND NOT (hDenyRead:repo1_jimbob OR hDenyRead:repo1_group1) AND NOT (mDenyRead:repo1_jimbob OR mDenyRead:repo1_group1) ) OR ((hRead:repo1_jimbob OR hRead:jimbob_group1) AND NOT (hDenyRead:repo1_jimbob OR hDenyRead:repo1_group1)) )

In this case, the query follows the pattern:
(lallow. ~ldeny. ~mdeny. ~hdeny)+(mallow. ~mdeny. ~hdeny)+(hallow. ~hdeny)

Note that in this example, the information system "repo2" was dropped from the filter because its state is "unreliable." Thus, although it is configured for early binding, it is not available to reliably report the user's principals.

In some embodiments, such an inbound check can only be performed if the permission information has been collected (e.g., via a data collector such as data collector 473 or data collector 773) and the permission information is indexed and stored (e.g., in unified index 415 or unified index 715). If the permission information has changed, that change will not be in the index until the next time the permission information is collected. So, this is as accurate and current as the information that is in the index. However, it is fast because a user's permission is evaluated as part of a search and can be appended to a query (e.g., in one embodiment, by using "AND GROUPID").

In some embodiments, an outbound check can be performed even if the permission information is not indexed. In this case, the query is received and a search performed. The question as to what search result that user can see is federated (via search API 811 and authorization service 863) to the information systems at the backend as they are the authorities on what their users are permitted to view. The authorization information is returned (via authorization service 863) to search API 811 and authorization post filter 806 is used to filter search results for the user based on the authorization information. The filtered search results are then returned for presentation to the user. Thus, in the second security model, the authorization would be accurate and current because it comes from the authority (a backend system). Furthermore, because the backend system is the authority, no modeling of permissions is necessary. However, this can be slow for users with sparse permissions.

The third security model can provide the benefits of inbound check 801 and outbound check 803. At query time, inbound check 801 can provide a fast and efficient way to define a scope of search for the query. Through outbound check 803, the authorization can be verified to make sure that the user's authorization to view the search results is up-to-date.

In some embodiments, an administrator for an information integration system can decide which one common security model to use, by changing the configuration file and restarting the service. Other implementations may also be possible.

The above examples illustrate that embodiments of an information integration system described herein may include reusable components. These reusable components may be configured to enable a plurality of functions, including discovery, data migration, data synchronization, content lifecycle management, in-place records management, search, etc. For example, in some embodiments, a set of reusable components may be provided for a search engine. In some embodiments, an application may utilize some of the reusable components to search and/or manage documents in disparate information systems at the backend.

Figure 9:
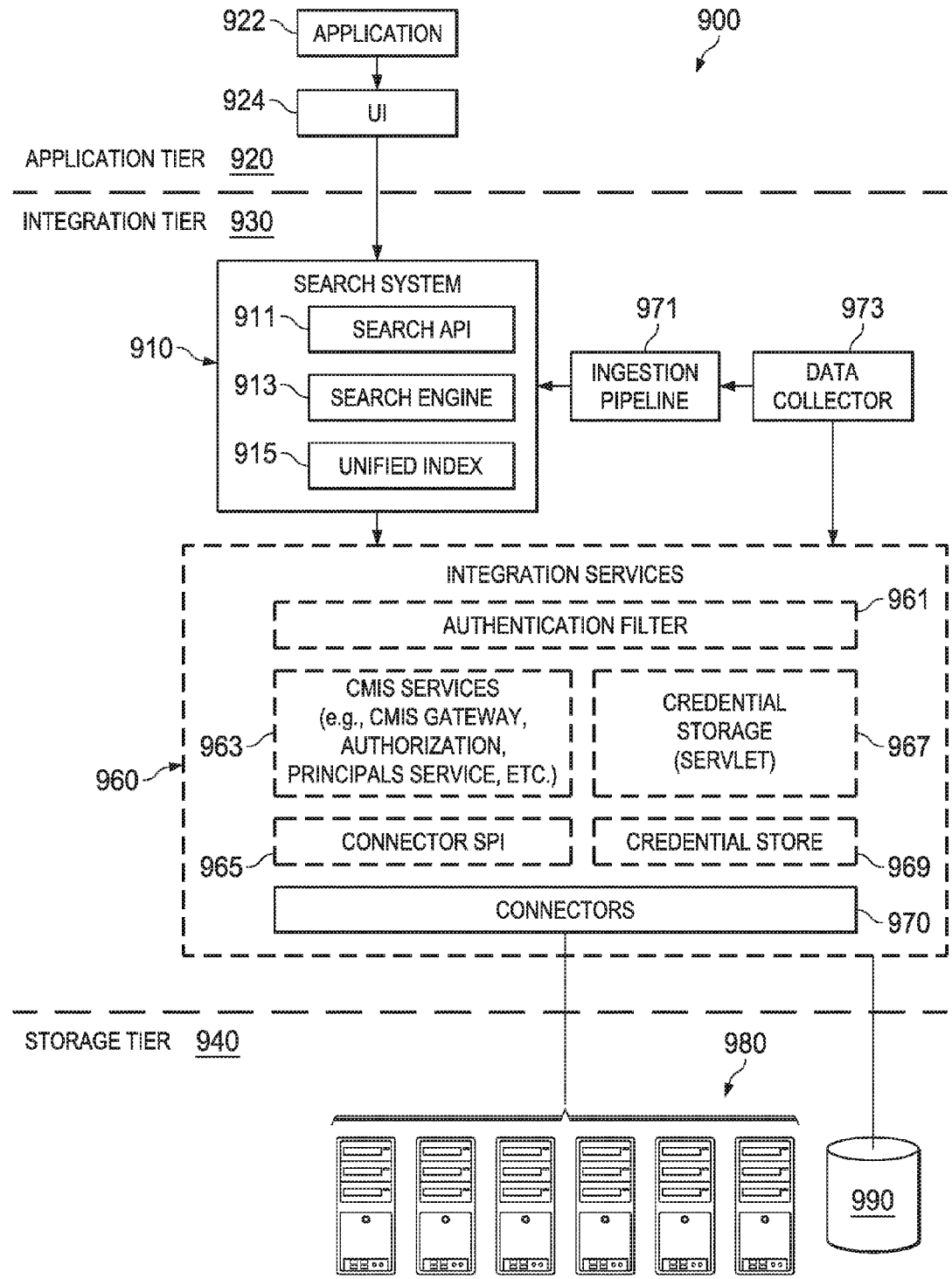
FIG. 9 depicts a diagrammatic representation of one embodiment of an information integration system with optional components.

FIG. 9 depicts a diagrammatic representation of one embodiment of an information integration system with optional components, as denoted by the dashed line boxes. System 900 may include application tier 920 having application 922, integration tier 930 having integration services 960, and storage tier 940 having information systems 940 and database 990. Database 990 may store configuration information as well as encrypted credential information for use by integration services 960.

Integration services 960 may reside at a layer between search system 910 and information systems 980 and between data collector 973 and information systems 980. Search system 910 may have search API 911, search engine 913, and unified index 915. Data collector 973 may collect data from disparate information systems 980 through integration services 960 and the collected data may be processed by ingestion pipeline 971 and used by search system 910 to build and/or update unified index 915 in the same or similar way as described above. Some embodiments of integration services 960 such as authentication filter 961, CMIS services 963, SPI 965, credential storage 967, and credential store 969 may be the same or similar to those described above with reference to integration services 760.

In the example of FIG. 9, application 922 can be a search application. Those skilled in the art will recognize that different search applications may be built to suit different needs. Examples of different search applications are described below with reference to FIGS. 13-15. Depending upon application, system 900 may further include a unique user interface (UI) layer 924. As illustrated in FIG. 9, UI layer 924 may be built on top of an embodiment of an information integration platform (e.g., integration tier 930) and configured to utilize a search system running on the information integration platform. For example, UI layer 924 may be configured to communicate with search API 911, filter data from disparate information systems at the backend using search engine 913 and unified index 915, and display the filtered data in various ways, as explained below. In some embodiments, system 900 may not need to include all the components of integration services 960.

As illustrated in FIG. 9, in one embodiment, integration services 960 may comprise only connectors 970 through which search system 910 and data collector 973 can fully enable application 922 in performing search functions, including faceted search described above.

Specifically, to build unified index 915, data collector 973 may collect data via connectors 970 from information systems 980 at storage tier 940 and provide the collected data to ingestion pipeline 971 for processing. Ingestion pipeline 971 may process the collected data and provide the processed data to search system 910 for indexing. Connectors 970 may map data from repository specific data models used by information systems 980 at the backend to an information integration common model as described above.

In an embodiment where search system 910 and data collector 973 only use connectors 970 in integration services 960, a user may not be able to act on a search result through integration services 960. For example, the user may not be able to directly manipulate an item of information (e.g., a document) referenced in the search result. However, the user can perform search via application 922 and view the search result. In this embodiment, when the user selects a search result, say, a document, the user is taken directly to the document, directly in the content management system where the document resides.

As the above examples illustrate, search systems and data collectors can be specific to search based applications. For search purposes, therefore, embodiments of an information integration system can be configured in various ways.

Figure 10:
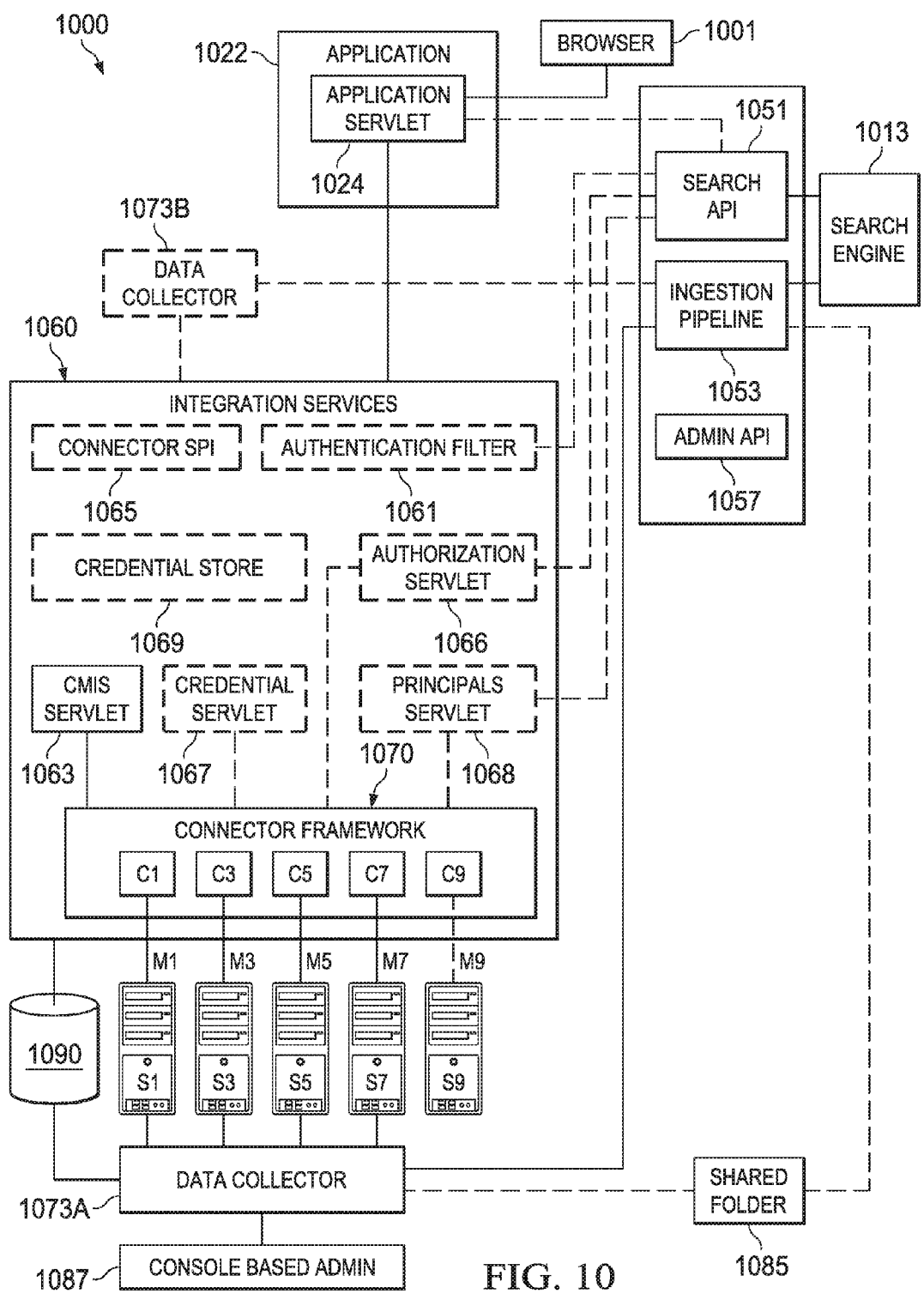
FIG. 10 depicts a diagrammatic representation of an information integration system with different possible configurations according to some embodiments.

FIG. 10 depicts a diagrammatic representation of an information integration system with different possible configurations according to some embodiments. In this example, system 1000 may include browser 1001 running on a client device associated with a user. Browser 1001 may run Backbone.jr for event based interaction of models, views, and controllers and jQuery for Document Object Model (DOM) manipulations. Backbone.js gives structure to web applications by providing models with key-value binding and custom events, collections with a rich API of enumerable functions, views with declarative event handling, and connects it all to an existing API over a RESTful JavaScript Object Notation (JSON) interface. jQuery is a multi-browser JavaScript library. DOM, JSON, Backbone.js, and jQuery are known to those skilled in the art and thus are not further described herein.

Browser 1001 may implement the model-view-controller (MVC) software architecture that separates the representation of information from the user's interaction with it. Those skilled in the art will appreciate that a model in the MVC architecture (referred to hereinafter as a browser model) may contain application data, business rules, logic, and functions; a view can be any output representation of data, such as a document or a diagram; and multiple views of the same data are possible. For example, the same set of data points may be represented using a histogram or a table. The controller mediates input and converts it to commands for the browser model or view.

In the example of system 1000, the browser models employed by browser 1001 are what communicate with application 1022 on the server side. Specifically, when a user clicks on a search form presented in a view, an underlying browser model communicates to application servlet 1024. Application servlet 1024, in one embodiment, can be a document server (DS) resource. As an example, system S1 can be a document server communicatively connected to application servlet 1024 and hence application 1022 via managed connection M1 to connector C1 and hence integration services 1060. Integration services 1060 may also be a DS resource. All DS resources are registered with the document server.

In the example of FIG. 10, when a search is performed, a search query is communicated from application servlet 1024 to search API 1051. Search API 1051 may authenticate the user (via authentication filter 1061), make sure that the search query has the authenticated user information in it, and call search engine 1013.

In one embodiment, search engine 1013 may implement Solr Cloud. Solr Cloud is multi-process distributed Solr. It may have multiple Solr nodes. Solr Cloud and Solr nodes are known to those skilled in the art and thus are not further described herein.

To perform the search, search engine 1013 may utilize a unified index such as unified index 415 or unified index 715 described above. In this example, such a unified index may be built by running data collector 1073A to collect data from information systems S1, S3, S5, and S7 at the backend, processing the collected data using ingestion pipeline 1053, and indexing the processed data. In one embodiment, data collected from information systems at the backend may be stored in shared folder 1085 and ingestion pipeline 1053 may read data from shared folder 1085, process the data, and provide the output to search engine 1013 for indexing. As an example, shared folder 1085 can be implemented utilizing an Extensible Markup Language (XML) file and a binary file.

In one embodiment, data collector 1073A may collect data from information systems using repository specific connectors and without using integration services 1060 in a manner similar to data collector 473 described above with reference to FIG. 4. In an alternative embodiment, data collector 1073B may collect data from information systems through integration services 1060 using connectors C1, C3, C5, and C7 in connector framework 1070 in a manner similar to data collector 773 described above with reference to FIG. 7.

In some embodiments, console based administration 1087 may allow an administrator user to perform command line tasks (other than using a graphical user interface) relating to data collector 1073A. In some embodiments, administration API 1057 may allow an administrator user to perform administrative tasks relating to ingestion pipeline 1053.

When a search is performed, a page result can be authorized by integration services 1060 using authorization servlet 1065. This is referred to as an outbound check. Similar to the example described above with reference to FIG. 8, authorization servlet 1066 may check with information system(s) at the backend as to what this user is permitted to view. If the user does not already have a session with a requested information system, credential servlet 1067 may access credential store 1069 to retrieve the user's credentials (e.g., a user ID and password) and calls CMIS servlet 1063 to open a session. The user password may be padded or normalized, encrypted and stored in database 1090 which may reside behind a firewall. If the common security model implemented by system 1000 calls for an inbound check to be performed, at query time, search API 1051 may call principals servlet 1068 to find out what the user is permitted to view per their principal(s), as explained above, before calling search engine 1013. Both authorization servlet 1065 and principals servlet 1068 can be optional in some embodiments.

Similar to the example CMIS gateways described above, CMIS servlet 1063 may utilize connectors C1, C3, C5, and C7 to map metadata from information systems S1, S3, S5, and S7 to an IS common model. Each of the connectors C1, C3, C5, and C7 may be communicatively connected to information systems S1, S3, S5, and S7 via managed connections M1, M3, M5, and M7. Connectors C1, C3, C5, and C7 are capable of performing bi-directional CMIS mapping described above. CMIS servlet 1063 knows which connector to call for which information system by utilizing the repository identifier (ID) in the search result. The repository ID is placed in the index along with the object ID for each object indexed in the unified index. Thus, responsive to a search result being selected for viewing, CMIS servlet 1063 may call a connector associated with the repository ID in the search result to obtain an object having the associated object ID.

A search result may be provided to a user in various ways. For example, a link may be provided to the user via browser 1001. When the link is clicked on, the user may be connected directly to a repository application (e.g., a content management application running on information system S1). In some embodiments, the user may be presented with an option to share the search result via a secure content sharing and synchronization system. For discussion and examples of a suitable secure content sharing and synchronization system, readers are directed to U.S. patent application Ser. No. 13/651,367, filed Oct. 12, 2012, entitled "SYSTEM AND METHOD FOR SECURE CONTENT SHARING AND SYNCHRONIZATION," which is incorporated by reference herein.

In the example of FIG. 10, connectors C1, C3, C5, and C7 for information systems S1, S3, S5, and S7 may be preconfigured connectors provided by system 900. Optionally, post-installation of system 900, a connector service provider may add an extensible connector C9 to create managed connection M9 for communicating with information system S9. An administrator may configure connector C9 using connector SPI 1065, as explained above.

As mentioned above, authentication filters such as authentication filter 1061 may be utilized to control access to information systems S1, S3, S5, and S7. In some cases, there may not be a need to have control over access. Alternatively, in one embodiment, an external authentication server may be used. In other embodiments, application 1022 may perform or otherwise handle authentication. Accordingly, depending upon applications, authentication filter 1061 and credential servlet 1067 may be optional.

In some embodiments, application 1022 may be a non-search based application and, therefore, search components such as search API 1051 and search engine 1013 may be optional. Depending upon whether application 1022 may be used for search purposes, different methods of information integration may be implemented, as illustrated in FIGS. 11 and 12.

FIG. 11 depicts a flow diagram illustrating one embodiment of a method for information integration across disparate information systems for non-search based applications. Method 1100 may comprise connecting an information integration system to a non-search based application and disparate information systems (step 1102). Step 1102 may be optional when adding extensible connector(s) post-installation of the information integration system. Method 1100 may further comprise configuring the connectors for bi-directional CMIS mapping as described above (step 1104). Once the connectors are configured, method 1100 may start integration services and service the non-search based application using the configured connectors.

FIG. 12 depicts a flow diagram illustrating one embodiment of a method for information integration across disparate information systems for search based applications. Method 1200 may comprise connecting an information integration system to a search based application and disparate information systems (step 1202). Step 1202 may be optional when adding extensible connector(s) post-installation of the information integration system. Method 1200 may further comprise configuring the connectors for bi-directional CMIS mapping as described above (step 1204); collecting data from the information systems (step 1206); analyzing data (which may entail converting content to text, summarizing the content, and determining keywords from the content, etc.) (step 1208); and building a unified index using data mapped to the IS common model as described above (step 1210). Depending upon implementation, data can be collected and then mapped or mapped and then collected. The unified index may be synchronized with the information systems at the backend (step 1212). Finally, method 1200 may start integration services and service the search based application using the configured connectors and the unified index (step 1214). From time to time, or on demand, the unified index may be synchronized with the information systems at the backend to ensure that the indexed information is up-to-date.

In some embodiments, document conversion may be performed by a data collector. In some embodiments, document conversion may be performed by an ingestion pipeline. As an example, this document conversion component may take a text based document and extract the text from it for indexing, takes a portable document format (PDF) document and extract the text from it for indexing, etc. This can be useful because some applications can write to the ingestion pipeline and do the conversion there and the data thus processed gets indexed without having to use a data collector or integration services. The ingestion pipeline is configurable, so it will also work when the document conversion is performed by a data collector.

Embodiments disclosed herein can work with various types of applications. Example use cases may include, but are not limited to discovery, content assessment, data migration, lifecycle management, etc. Embodiments of an information integration system disclosed herein provide a unified way for an application to analyze, search, manage, manipulate, and/or access disparate information systems at the backend while providing an easy way to add new information systems via extensible connectors without requiring custom integration. As described above, search results from various information systems can be integrated at the information integration system and provided to an application connected thereto. The application may present the search results in various ways, one example of which is illustrated in FIG. 13.

Figure 13:
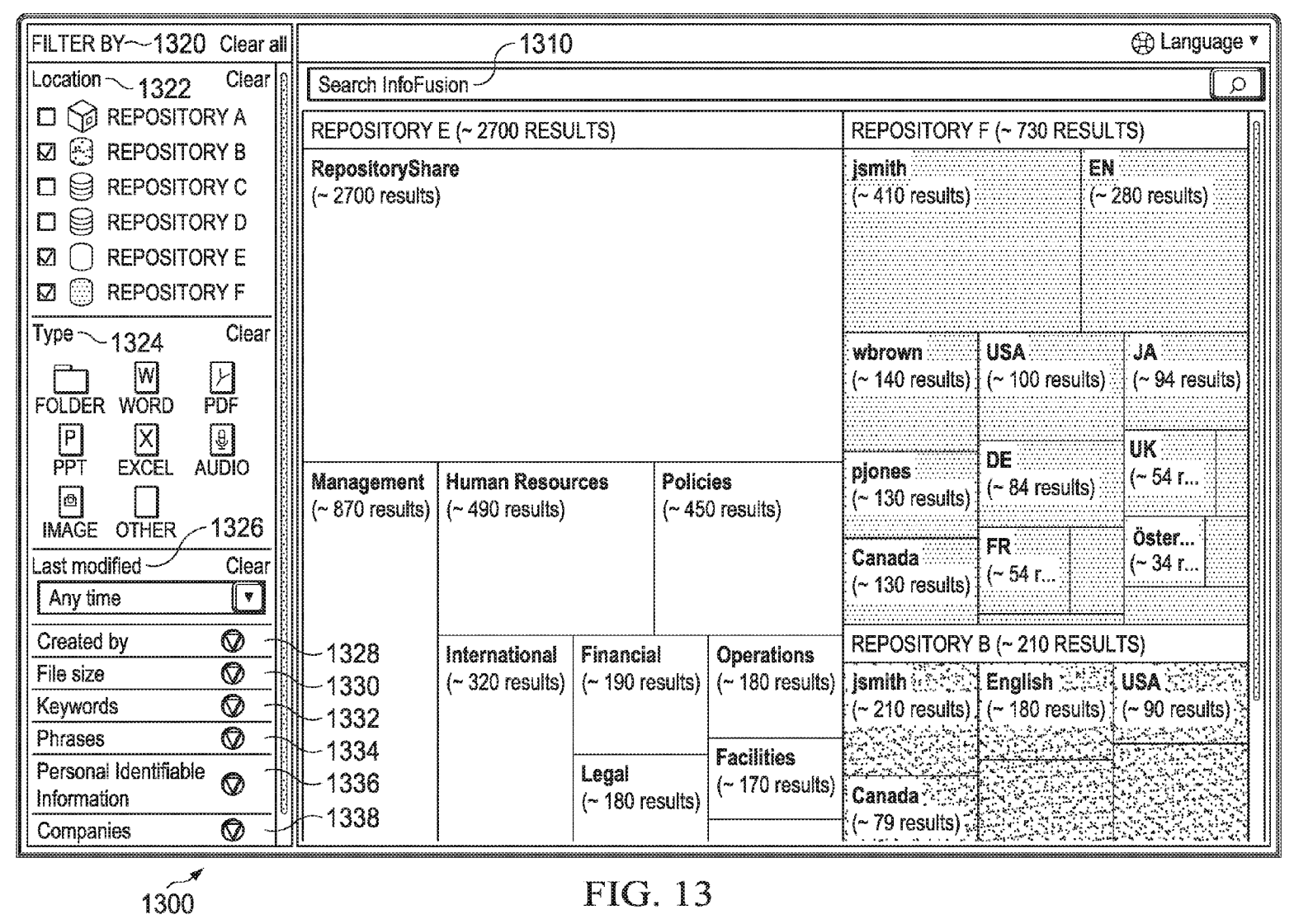

FIG. 13 depicts a diagrammatic representation of user interface (UI) 1300 of an example discovery application displaying search results provided by one embodiment of an information integration system disclosed herein. The discovery application may implement various functions of the information integration system via a unique UI layer (e.g., user interface layer 924 shown in FIG. 9). The UI layer may comprise a library of various user experience (UX) UI components that can be used as building blocks by application developers and that can be combined in various ways to create different applications. Because, as explained above with reference to FIG. 9, the UI layer is built on top of an embodiment of an information integration platform, these UXUI components can take advantage of a unified index provided by the information integration platform. Specifically, the UXUI components can be configured to interface with a search API running on the information integration platform. Since the UI layer communicates with disparate information systems through integration services, no complicated programming is required.

The UXUI components can be used to create one or more filter widgets in an application to allow an end user to effortlessly create various visualizations of data across disparate information systems. This approach (using UXUI components built on top of an information integration platform to create applications) makes for a very flexible and efficient way to develop custom applications for the information integration platform.

For example, as illustrated in FIG. 13, the example discovery application may have search function 1310 and filtering function 1320. Filtering function 1320 may include various filter widgets 1322-1338. Each filter widget may be associated with a UXUI component configured for visualizing data from disparate information systems according to certain metadata indexed and stored in the unified index. Examples of such metadata may include location, file system path (e.g., folder, file type, etc.), age (e.g., last modified), creator, file size, keywords, phrases, phrases, personal identifiable information (PII), companies, language, country, departments, etc. The UXUI components may implement various visualization techniques.

In the example of FIG. 13, suppose a user wishes to search repositories B, E, and F. Repositories B, E, and F may store different types of information. For example, repository B may store documents written in languages of different countries; repository E may store information related to departments in the user's company (e.g., management, human resources, etc.); and repository F may store contents created by various authors for use in various countries. Location widget 1322 may be used to select repositories B, E, and F; creator widget 1328 may be used to select author(s); and keywords widget 1332 may be used to select departments, countries, and/or language(s). These user selections/inputs may be communicated to the search API running on the information integration platform. The search engine uses the unified index to locate the requested data and returns the search results via the search API. Filtering function 1320 may interpret the search results and use a tree map methodology to display a visualization of the search results where each box displayed in UI 1300 represents a node in the tree, and the size of the box represents the number of the results for the metadata of interest.

Additionally, via a CMIS gateway described above, the discovery application may allow a user to set credentials for their access to a repository at the backend, browse the data on the repository (e.g., select by type), delete a file in the repository, add an object to the repository, and/or download a document from the repository. Other implementations may also be possible.

Those skilled in the art will appreciate that different applications may be created using different combinations of UXUI components at the UI layer. FIG. 14 depicts a diagrammatic representation of a user interface of an example lifecycle management application displaying a dashboard generated using an embodiment of an information integration system disclosed herein. In this example, UI 1400 shows different visualizations 1410, 1420, 1430, and 1440. Each visualization can be a manifestation of a particular combination of UXUI components. This is further illustrated in FIG. 15.

Figure 15:
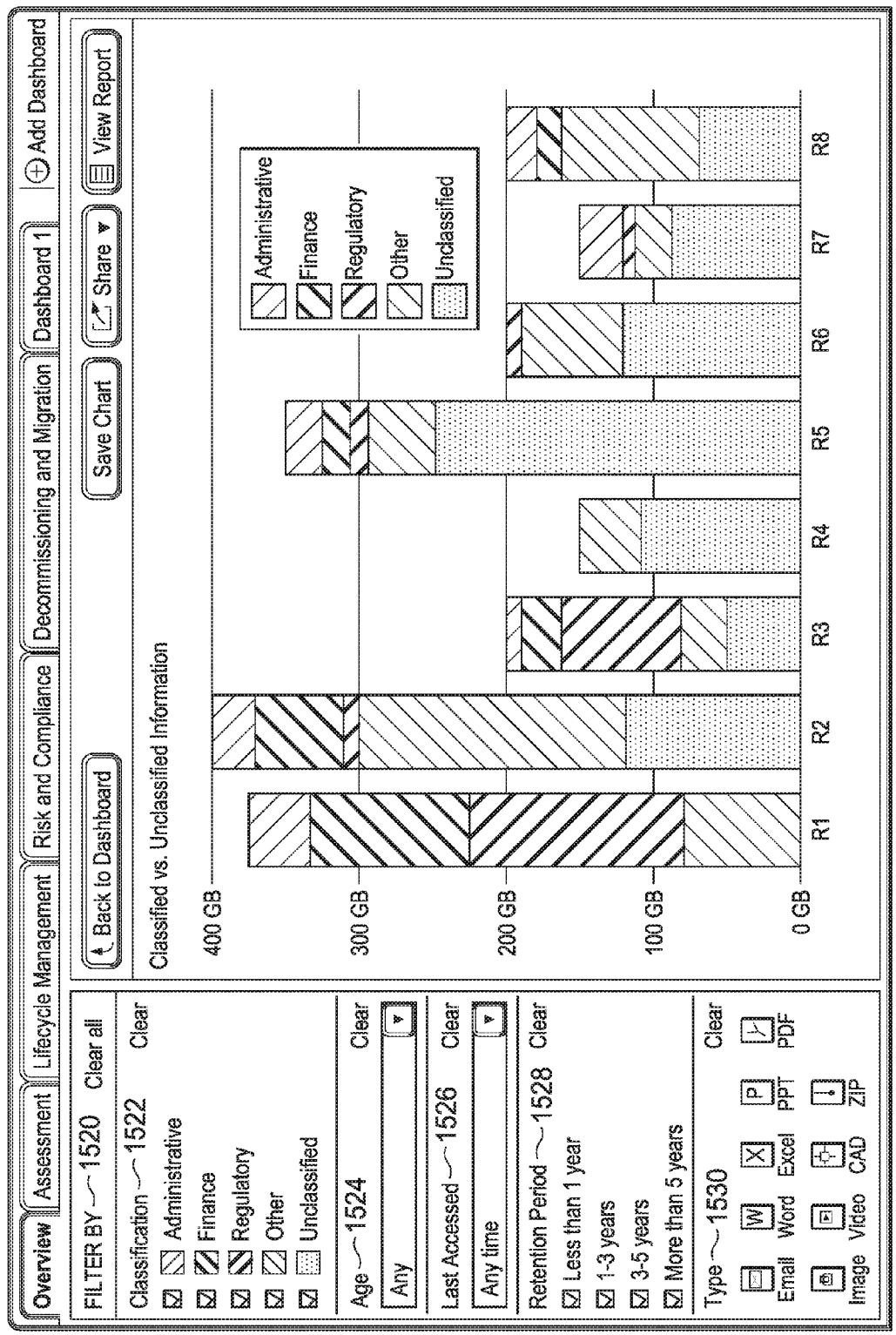
FIG. 15 a diagrammatic representation of a page view of an example lifecycle management application, illustrating that data from disparate information systems can be aggregated and filtered using an embodiment of an information integration system disclosed herein.

FIG. 15 depicts a diagrammatic representation of page view 1500 illustrating filtering function 1520 having classification widget 1522, age widget 1524, access widget 1526, retention widget 1528, and document type widget 1530. Similar to what is described above with reference to FIG. 13, user interactions with these widgets (e.g., user selections and/or inputs) may be communicated to a search API running on an embodiment of an information integration platform disclosed herein. A search engine may use a unified index maintained by the information integration platform to locate the requested data (selected via one or more of widgets 1522-1530, in this example) and returns search results via the search API. Filtering function 1520 may interpret the search results and display a visualization of the search results using a bar chart. Various other visualization techniques are also possible.

In the example of FIG. 15, the bar chart provides a visualization of classified vs. unclassified information. Classified means that a records management classification (or any other category) has been assigned to these documents. A classification can be assigned by various ways: manually by end user, by inheritance from a folder or by an automated system such as Auto-Classification. Unclassified means that these documents do not have a records management classification or any other categories. Records management classifications are used to organize information and drive retention and disposal of content as required by law and/or policy. This chart provides an overview of the proportion of content that is under a retention policy vs. content that is not subject to classification.

As discussed above with reference to FIG. 2, an extract, transform, and load (ETL) tool called Open Text Integration Center (OTIC) can provide a non-limiting example of application 222. OTIC provides core ETL capabilities, combining database functions such as extract, transform, load into one tool to pull data out of one database and place it into another database. Extract refers to the process of reading data from a database. Transform refers to the process of converting the extracted data from its previous form into the form it needs to be in so that it can be placed into another database. Load refers to the process of writing the data into the target database.

As illustrated in the example of FIG. 2, information integration server 250 may include integration services 260 which can provide OTIC with synchronous access to backend systems 280 residing at storage tier 240, allowing OTIC to serve as a hub of enterprise content management (ECM) and process data among databases. An ECM system such as Open Text Content Server (OTCS) can provide a non-limiting example of a backend system.

Figure 16:
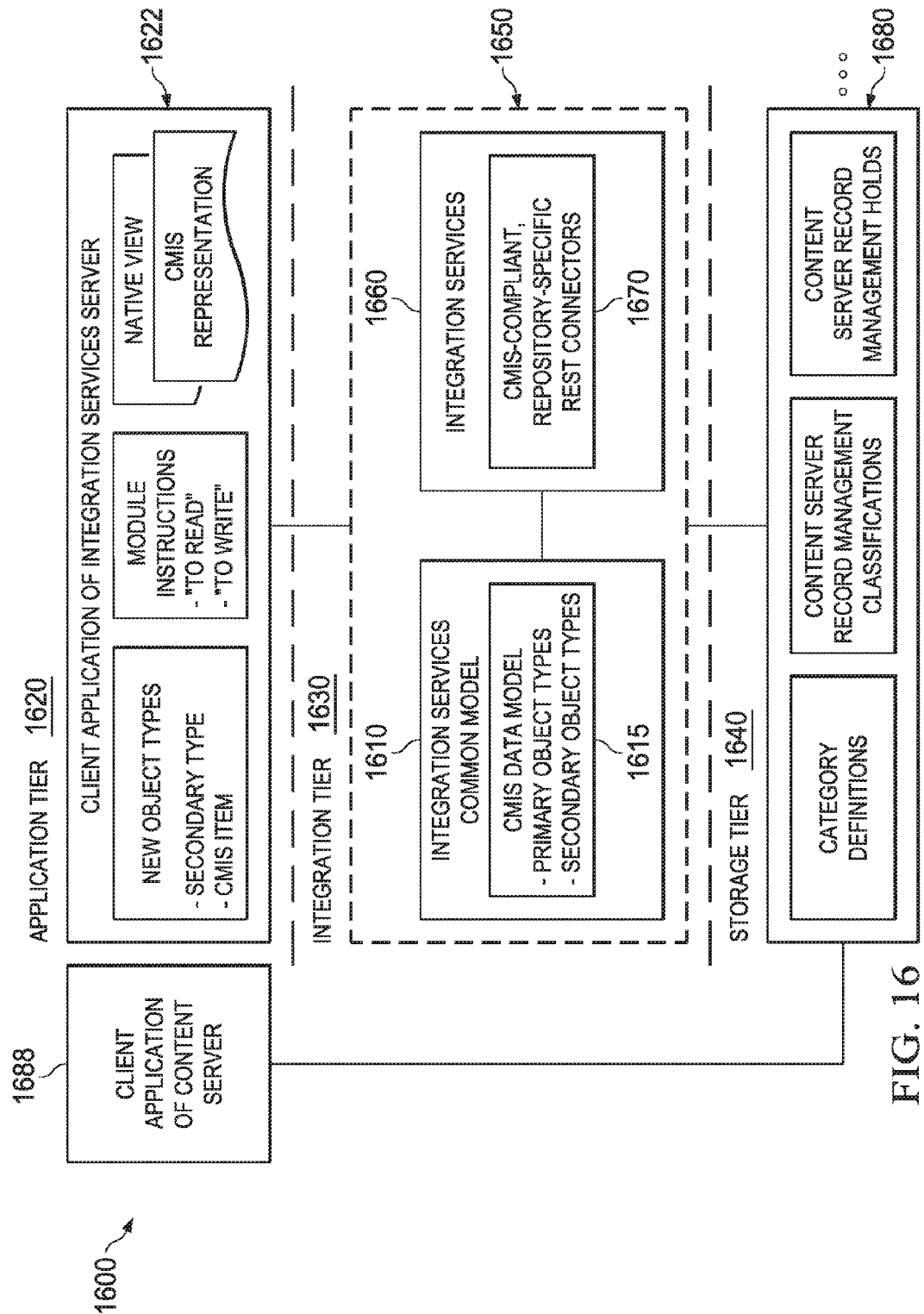
FIG. 16 depicts a diagrammatic representation of CMIS-compliant integration services architecture that provides an ECM-independent ETL solution, according to some embodiments disclosed herein.

Processing document in different ECM systems requires different ECM models. For example, OTCS has OTCS-specific "categories" which do not work with another ECM system. To address this issue, FIG. 16 depicts a diagrammatic representation of improved, CMIS-compliant integration services architecture that provides an ECM-independent ETL solution. For the sake of brevity, some portions of the integration services architecture that have been discussed above are not repeated below. Upon understanding the details discussed below and the accompanying drawings, skilled artisans can readily adapt or otherwise implement the ECM-independent ETL solution disclosed herein.

Referring to FIG. 16, to implement an ECM-independent ETL solution, several changes may be made at integration tier 1630, with some changes to application 1622 at application tier 1620. As a result of these changes, which are discussed below, ECM support is generalized through CMIS-compliant components at integration tier 1630 and the behaviors of application 1622, which is a client application of CMIS-compliant integration services (IS) server 1650, are also changed. Skilled artisans appreciate that any application can be readily configured to take advantages of CMIS-compliant IS server 1650. Thus, although OTIC and OTCS are used as examples below, embodiments disclosed herein are meant to be illustrative and non-limiting.

As discussed above, an object of the invention is to generalize ECM support through CMIS-compliant components at integration tier 1630, eliminating a need to configure each individual application 1622 with ECM-specific support. To accommodate this generalized ECM support by IS server 1650 and be able to fully utilize CMIS-compliant connectors 1670 (which are part of IS 1660 running on IS server 1650), application 1622 can be enhanced, for instance, by adding a new object type called "Secondary Type." Using OTIC as a non-limiting example of application 1622, a new OTIC object type "Secondary Type" would be added.

CMIS-compliant connectors 1670 can map ECM-specific object types from ECM system 1680 at storage tier 1640 to those of application 1622 using CMIS data model 1615, which are part of IS common model 1610 and which comprises primary object types and secondary object types defined according to CMIS specification. CMIS-compliant connectors 1670 are repository-specific. Accordingly, suppose OTCS exemplifies ECM system 1680, CMIS-compliant, repository-specific connectors for OTCS may be referred to as OTCS connectors or CS connectors.

In some embodiments, as explained below, CS connectors are particularly configured to map CS types, including CS categories, to CMIS secondary types (which can be used by any application that follows the CMIS data model). For example, a CS connector can map "properties" from OTCS, Documentum, ECM, etc. to a secondary type (if there is not a primary type to map to) so that regardless of where content comes from (e.g., OTCS or Documentum or ECM, etc.), the CS connector can map the content to some primary type or secondary type in CM IS. In this way, every piece of content gets a "type" (either primary or secondary), regardless of the source of the content. Any "secondary type" could be attached to any "primary type" (e.g., a document, a folder, a CMIS item, etc.). A technical effect is that documents from disparate systems 1680 can be linked through IS server 1650 to one another even if they were created in distinct systems 1680.

The CMIS "secondary object types" (also referred to herein as "secondary types") feature was introduced in CMIS 1.1. A secondary type defines a set of properties that can be dynamically added to and/or removed from objects. This is different from primary object types (also referred to herein as "primary types"). Primary types such as documents and folders have a predefined set of properties that are fixed. With secondary object types, additional properties can be added to and/or removed from CMIS objects.

Additional differences exist between primary types and secondary types. For example, each instance of a primary type (e.g., a document or a folder) corresponds to a distinct object; whereas, each instance of a secondary object type does not correspond to any object. Secondary types are not permanent and do not exist on their own, without being applied to a primary type. For example, in CMIS, a secondary type definition can be provided for a "category," but this "category" is not created until it is applied to an object (e.g., a file or a folder) so that the object has an additional property called "category." Until then, the secondary type is not creatable, file-able, or controllable. Therefore, the "creatable," "fileable," "controllablePolicy," and "controllableACL" object type attributes are not applicable to a secondary type and are set to FALSE by default. Secondary types can be applied at object creation time (e.g., by populating the multi-value property "cmis:secondaryObjectTypeIds" with the identifiers (ids) of the secondary types). All properties defined by these secondary types can be set at that time as well.

Secondary types can be added and removed later by changing the cmis:secondaryObjectTypeIds property, either through the updateProperties service or the checkIn service (in CMIS service). Adding the id of a secondary type to this multi value property adds the secondary type. Providing values for the associated properties of this secondary type may be done in the same operation. Removing the id of a secondary type from this multi-value property removes the type and all associated properties and values.

Multiple secondary types can be applied to the same object at the same time. As will be described below, this means that multiple CS categories can be assigned to the same document or multiple holds can be applied. Secondary types can be markers without properties. For example, if a document has a CS record management (RM) hold, a secondary type attached to the document may indicate that there is a CS RM hold and no additional properties.

Several significant technical changes have been made to IS 1660 at integration tier 1630 so that IS 1660 can support as many CMIS types defined in CMIS data model 1615. As discussed above, secondary type support is repository-specific, on a connector basis. Accordingly, to be able to take advantages of CMIS secondary types, a repository (e.g., ECM system 1680) at storage tier 1640 is to be connected to IS 1660 via its own CMIS-compliant connector 1670. All secondary types should be inherited directly or indirectly from a CMIS secondary type base object type (e.g., "cmis:secondary"). If a repository does not support secondary types, the secondary type base object type will not be returned by a service call (e.g., getTypeChildren) and no secondary types will appear next to the document or folder being called. A repository that does not support secondary types may throw a constraint exception when, for instance, a user of application 1622 tries to apply a secondary type to an object managed by the repository. The exception may notify the user that a secondary type cannot be added to or removed from the object.

A repository may support create, read, update and delete (CRUD) operations for secondary types through CMIS repository services (e.g., via methods such as getTypeDefinition, createType, updateType, deleteType). Such CRUD support can be connector-specific.

A goal in implementing CMIS secondary types in IS 1660 is to support OTCS's category feature. Similar to a secondary type, a CS category defines additional attributes that can be dynamically applied to or removed from an object. That is, once a CS category is applied to a CS object, that CS object has additional properties.

However, OTCS-specific "categories" do not work directly with the CMIS data model. Unlike CMIS, categories in CS appear as primary type objects in the CS object tree and can be created, modified, deleted as regular objects. Recall that secondary types cannot exist on their own and must be applied to a primary type object. This is a technical conflict between CMIS and CS implementations or, more specifically, between CMIS secondary types and CS categories.

To resolve the technical differences between CMIS secondary types and CS categories, connectors 1670 can be particularly configured to implement CMIS-compliant, CS-specific, and non-application-specific REST Connector Web Services (REST/CWS connectors). For the sake of brevity, CS REST/CWS connectors are referred to herein as CS connectors. These CS connectors allow seemingly unrelated applications to connect dynamically through REST. A CWS universal resource locator (URL) may specify the location of IS server 1650 that provides the connector web services and with which a particular CS connector communicates directly.

FIGS. 17A-17B provide, as a non-limiting example, types and operations 1700 of an embodiment of a CS connector. In some embodiments, the primary type is defined for the CS connector as being inherited from "cmis:document" for category objects appearing in the CS object tree. For example: all category objects may have a specific CMIS document type identified by subtype identifier 1701 (e.g., "131" as shown in FIGS. 17A-17B). Each instance of a CS category has a definition and can be viewed in a CMIS type definition tree as a secondary type with "131:<category_id>" value as a type id. This type id can be used when applying or removing a category from primary type objects. When a user views a CS category object through CMIS, the user can see that the CS category object has a special property which points to a secondary type associated therewith. That is, in the content server and in its connectors, a category object is defined so that when a user navigates, for instance, via an administrative graphical user interface (GUI) of IS server 1650, to the content server's object tree, the category object can be viewed as a document which has a type "131" inherited from "cmis:document." An example view is shown in FIG. 18.

Figure 18:
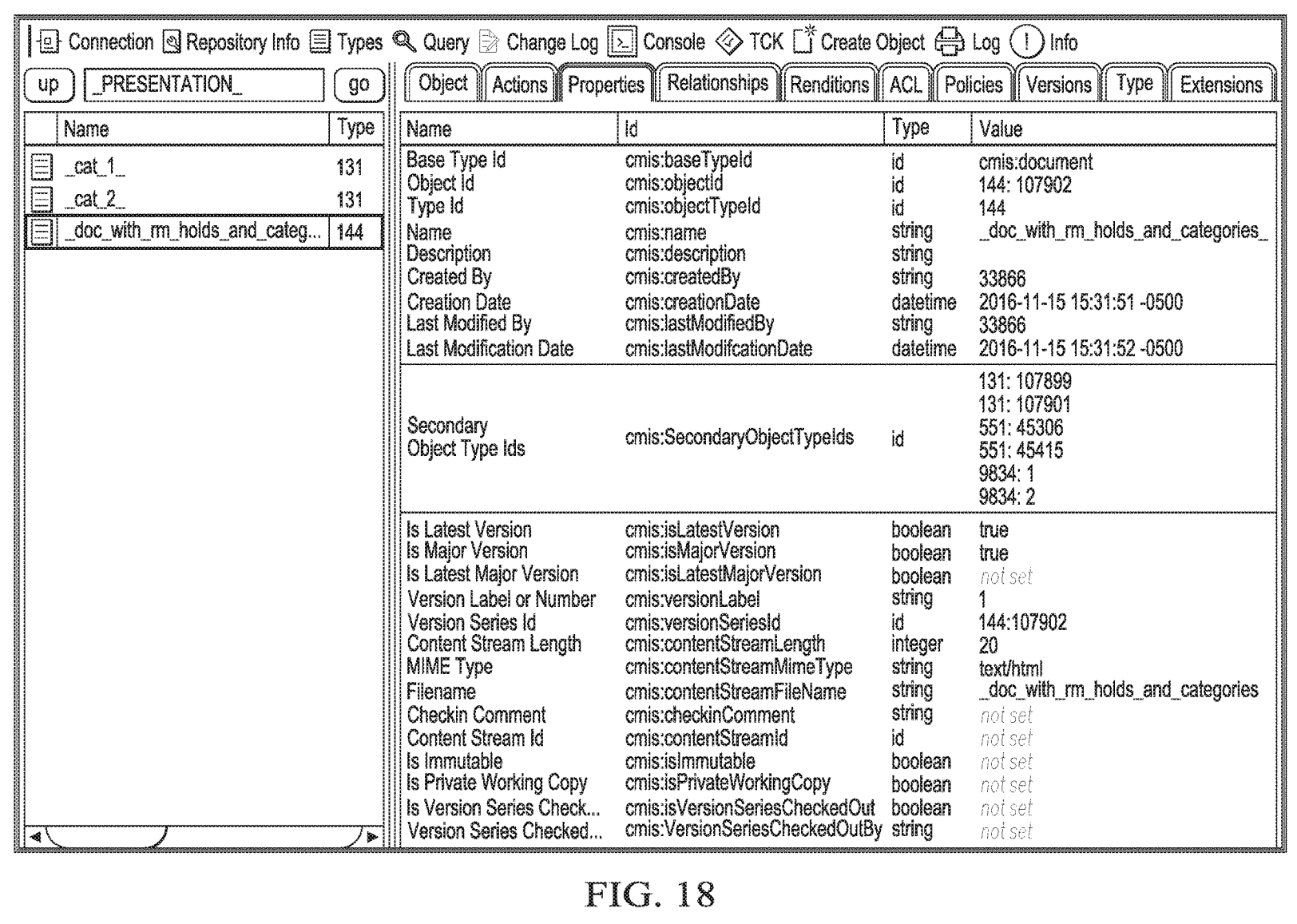

In FIG. 18, three documents are shown. Two of the documents are actually category objects having the specific CMIS document type "131" and one document has a type having a subtype identifier "141." Referring to FIGS. 17A-17B, both subtypes "131" and "141" are inherited from the primary type "cmis:document." As illustrated in FIG. 18, in addition to CMIS information pertaining to object properties and version properties, the user can also view category properties, classification properties, and hold properties.

Figure 19:
FIGS. 19-20 depict examples of OTIC "secondary type" documents.
Figure 20:
Figure 21:
FIG. 21 depicts an example of a document with two "secondary types" attached.

From the perspective of the CMIS, when a user of application 1622 views such an object, it appears as a document (even though a "category" would have been a secondary type and thus cannot exist in the CMIS realm without being attached to a primary object). FIGS. 19 and 20 depict diagrammatic representations of screenshots from a GUI of application 1622 illustrating how a user of application 1622 may view "secondary types" (e.g., CS categories) as "documents." FIG. 19 shows an example of an OTIC "secondary type" with three date attributes and FIG. 20 shows another example of an OTIC "secondary type" with three int attributes. Only the CMIS representation of each attribute is shown. FIG. 21 shows a document with two "secondary types" ("Ext1" and "Ext2") attached. The GUI of application 1622 shows only CMIS representation of each attribute.

Operations on these special "documents" can be limited to management functions (e.g., view, delete, etc.). For example, if a user wishes to delete a folder which contains categories, the user should first delete those categories "documents." Furthermore, each category as an object and as a secondary type should be in sync. For example, deleting a "category" as an object from the CS object tree also removes the secondary type from the CMIS type definition tree. Likewise, deleting the secondary type from the CMIS type definition tree, the corresponding object in the CS object tree should also be deleted.

Figure 22:
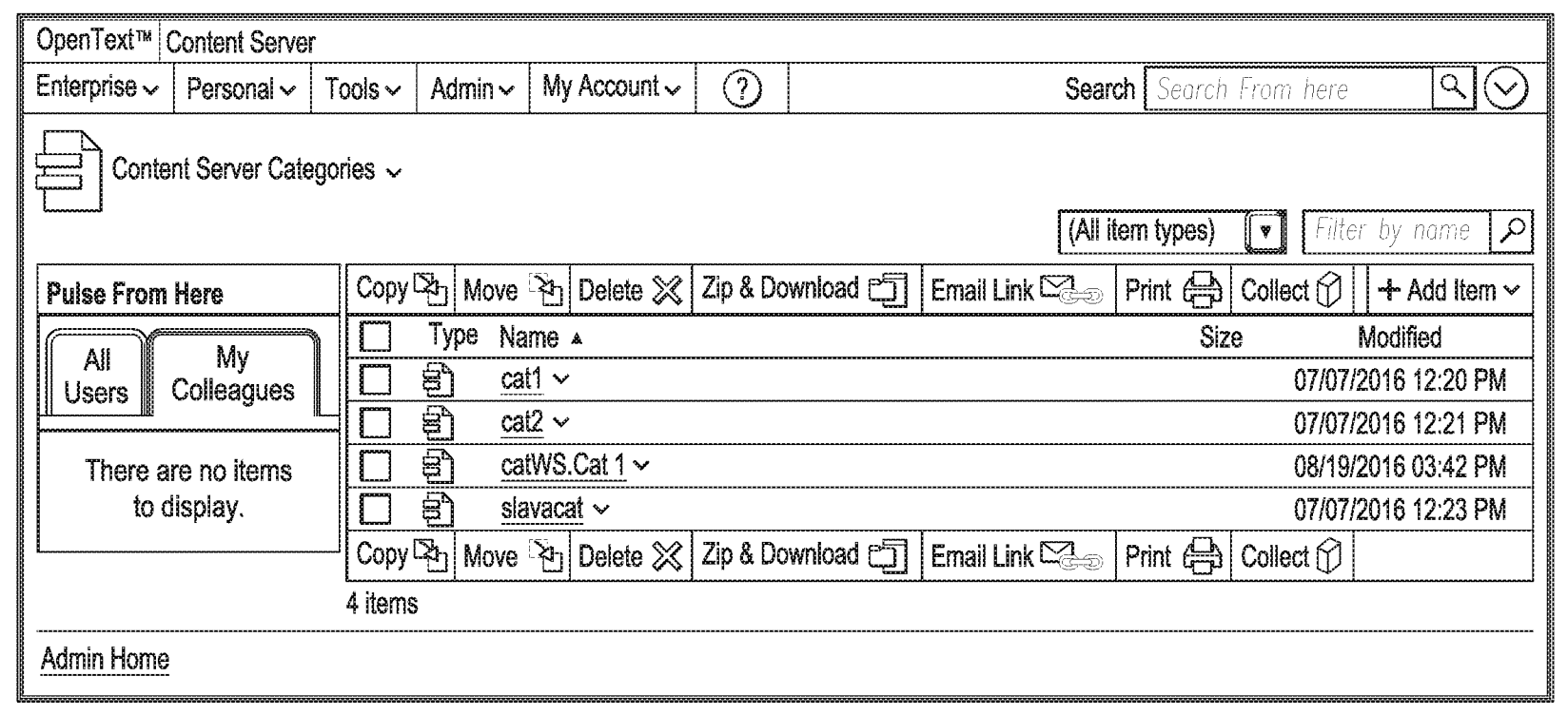

Referring to FIG. 16, on startup, CS connector 1670 may try to import (e.g., from OTCS 1680) category definitions as secondary type definitions using, for instance, OTCS-specific APIs. Once a user is logged in to a client application of OTCS (e.g., CS workbench application 1688), the user can view and access CMIS secondary types, category definitions, along with RM classifications and RM holds. An example GUI of OTCS is shown in FIGS. 22 and 23, with FIG. 22 showing example CS category definitions and FIG. 23 showing example CS classifications. CS connector 1670 can retrieve whatever CS connector 1670 is allowed to retrieve (e.g., category definitions, CS RM classification definitions, RM holds, etc.) from OTCS 1680, if available based on user account privileges. For example, suppose a user who has logged into use IS 1660 has access to only one of the CS categories that the user had defined using CS workbench application 1688. In this example, CS connector 1670 may only import the CS definition created by the same user and not import CS definitions created by other CS users.

FIG. 24 provides an example view of what a user can view via an administrative GUI of IS server 1650. The user can view properties (also referred to herein as attributes) with the appropriate category attached. When a category is attached, the properties will come across with the category type id (e.g., "131"). As shown in FIG. 24, the user gets the "Secondary Type Id" property as part of the object property. This tells the user that category "77037" is attached. Because the value for this property, the object type id is therefore "131:77037," as shown in FIG. 24. With this object type id, the user can view (and it references) all the category attributes and information provided by this category "77037." Here, the user can view this category as a primary type, meaning that it is viewed as a CMIS document. However, but because it is also a CS category (e.g., in OTCS), the user is provided with the custom IS property "Associated Secondary Type Id" that tells the user that this category, even though it is an object, also has an associated secondary type definition associated with it. This means that if the user selects tab 2401 to view "Types" and finds "131:77037," the user can view the category definition for category "77037" under Types.

FIGS. 25A-25B provide an example view of "Types" showing imported category definition (which, according to the user privilege, only one of the four category definitions shown in FIG. 22 was imported), RM classifications, and RM holds. The example "Types" view of FIGS. 25A-25B show in more detail a classification called "_csu_rmc_2_" having an object type id "551:45306" where "551" is the subtype identifier for CS connector 1670 to recognize that it is an RM classification (see FIGS. 17A-17B).

Application 1622 at application tier 1620 does not need to know the CS categories imported by CS connector 1670. When application 1622 wants to apply a CS category, it works with CMIS secondary types and CMIS documents (via its own object types "secondary type" and "CMIS Item) and not the CS category. That is, no CS category objects are exposed to application 1622. This gives a separation between the CS connector (which is CS-specific) from manipulation inside of application 1622. From the perspective of application 1622, it is working with a CM IS-compliant system. This provides a technical effect of allowing application 1622 to operate in a way that is independent from any specific ECM system (e.g., OTCS).

Figure 26:
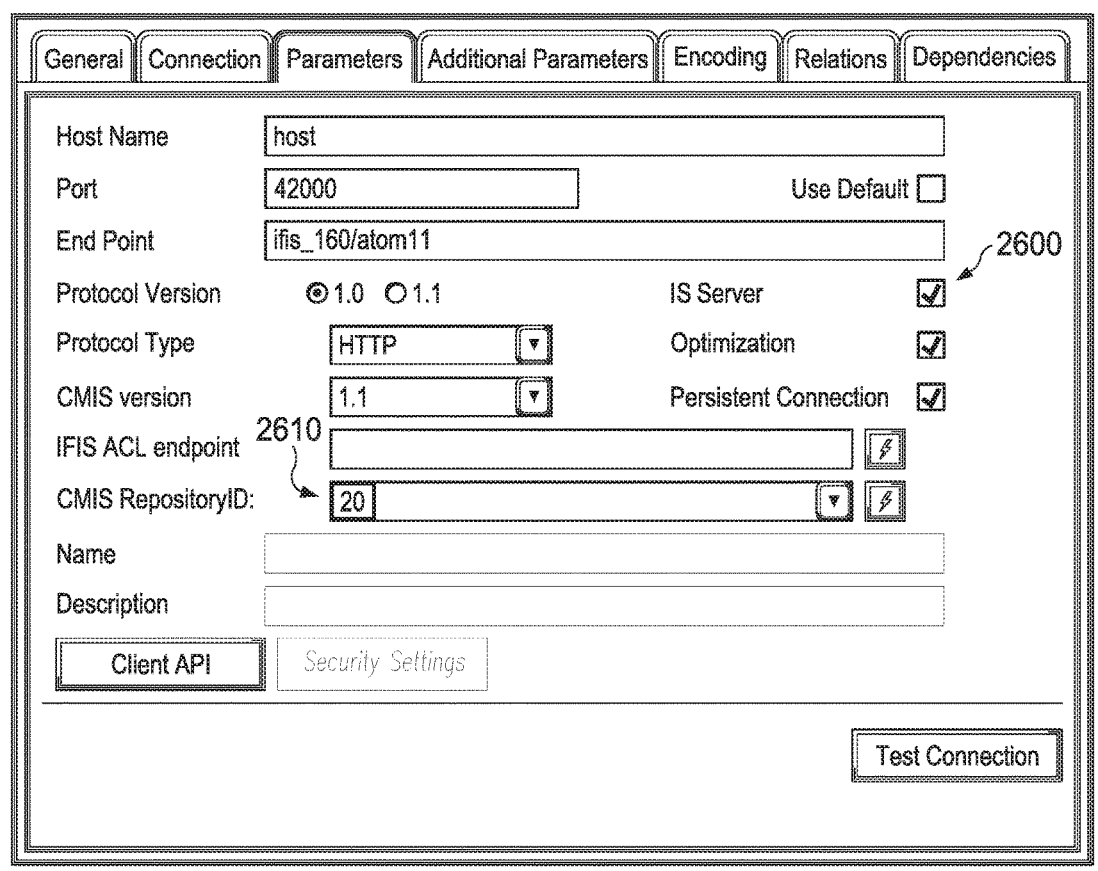
FIG. 26 depicts a diagrammatic representation of an example view of a graphical user interface of an application.

As an example, suppose a Word document has a CMIS connection, a new OTIC object, and CMIS items. This document is for OTIC (which can be a non-limiting example of application 1622) and a user has signed in to OTIC. When the CMIS connection has "IS Server" set to be ON and the OTIC user is switching a repository id via a GUI of OTIC (see, e.g., IS server 2600 is selected by a user and the user is changing a value in a repository field referred to as "CMIS RepositoryID" 2610 as shown in FIG. 26), then the following logic is implemented:

If the CMIS connection has no dependencies, proceed.

If CMIS connection has dependencies, prompt user with warning that by changing repository id objects could have a different structure.

As illustrated in FIG. 16, OTIC can be implemented with a new OTIC object type called "secondary type" and the parent object for "secondary type" can be an OTIC repository based on the CMIS connection. "Secondary type" cannot have another "secondary type" attached to it. Any "secondary type" could be attached to any "primary type" (e.g., document, folder, CMIS item, etc.). Furthermore, "secondary type" attributes (or properties) will be editable (e.g., add, modify, delete, etc.) to the OTIC user via the GUI. Each attribute will have CMIS representation. An attribute representation for "secondary type" may be called "native view" and may consist of the view of all attributes represented in the native format (e.g., XML as an example for atom pub binding). A "native view" may be editable by the user and could be created during a metalink flow. In this disclosure, metalinks refer to pluggable metadata bridges embedded in an EMC service provided by the integration services.

A "native view" could have a hierarchical representation of attributes. Both "native view" and CMIS representations may be stored in the OTIC object (e.g., inside application 1622). A "native view" representation may be used only in case when a user wants to create an instance of a "secondary type" object on the server. In all other cases, CMIS representations will be used.

Objects of "secondary type" could be created manually by a user or via a metalink. When creating via metalink, following logic will be applied:

OTIC receives secondary type definition.

OTIC parses out the CMIS secondary type definition of each attribute. This is understood to be "CMIS type property definitions," which is a flatten representation of an actual hierarchy.

OTIC parses out "native view" definition attributes.

Both definitions are stored in the "secondary type" object.

When creating manually, only the CMIS representation may actually be stored and the "native view" can be stored as an empty string. When a user tries to create an instance of that "secondary type," a module instruction (e.g., a modeled script called "CreateTypedEcmItem") will become invalid with a proper message. In case of hierarchy (an example of which is CS category), it is up to the CS connector (e.g., connector 1670 in FIG. 16) to present to OTIC (e.g., application 1622) with a flatten structure. OTIC can use the same flatten structure to communicate back to the CS connector. To make this process easier for OTIC, the CS connector may provide a 'key' to link the "native view" for each attribute to its "CMIS definition."

Figure 27:
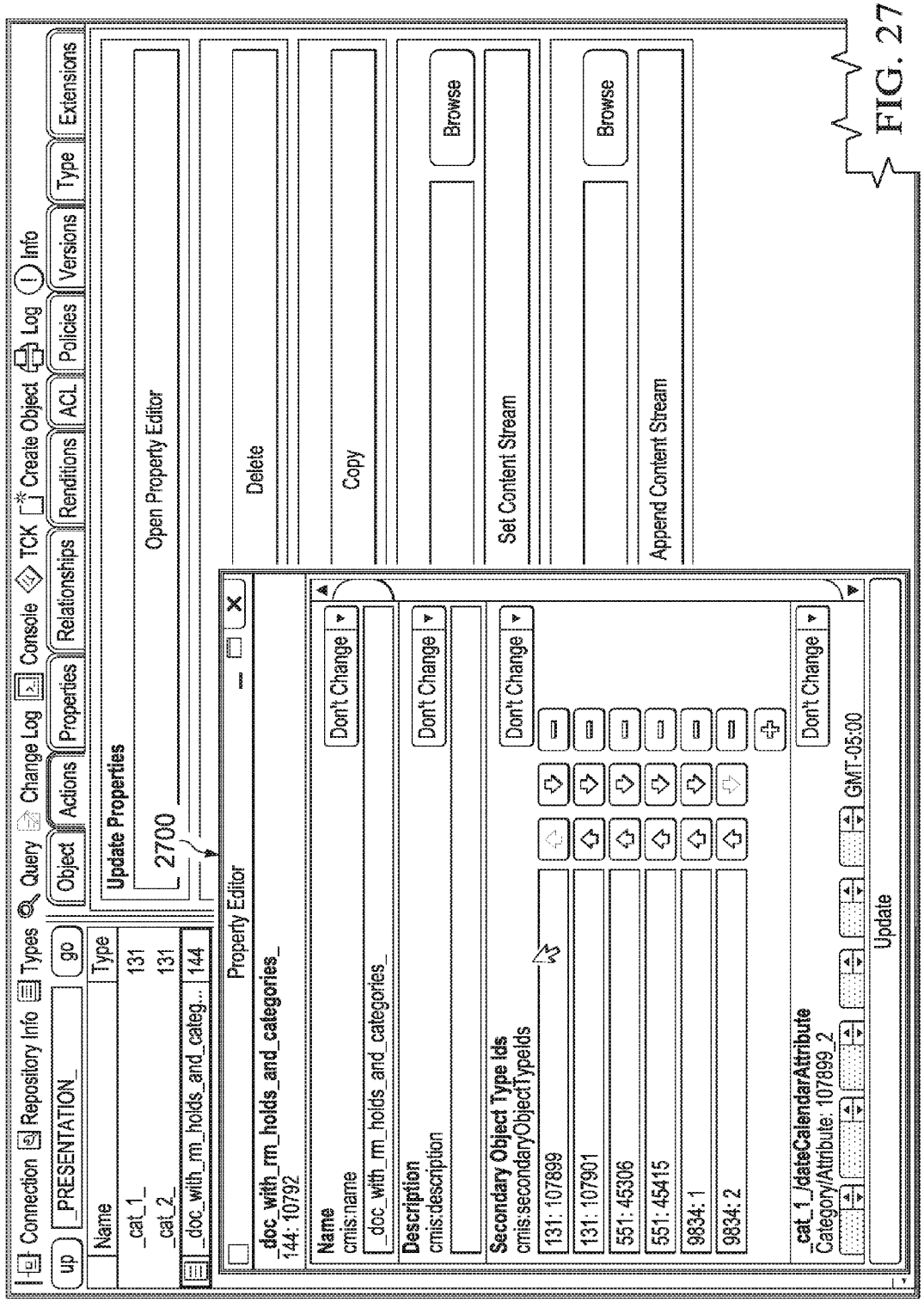
FIG. 27 depicts a diagrammatic representation of an example view of a graphical user interface of a property editor.

In addition to the new OTIC object "secondary type," another new OTIC object type called "CMIS Item" can be added to OTIC. This object type can be similar to an OTIC object ECM Document. It covers CMIS objects that do not fit into "documents" and "folders," for example, "CS URL." The parent object for "CMIS Item" is the OTIC repository based on the CMIS connection. "CMIS Item" is considered as one of the "primary type" and could have "secondary type(s)" attached to it. However, "CMIS Item" itself cannot be attached to any object. Attribute definition and business rules for "CMIS Item" are the same as those for the new OTIC object "secondary type" discussed above. FIG. 27 depicts a diagrammatic representation of property editor 2700 which a user can use to manually attach or detach secondary types.

In some embodiments, in addition to the above changes to application 1622 (e.g., adding two new OTIC objects "secondary type" and "CMIS item"), OTIC primary objects "Document" and "Folder" based on a CMIS repository can also be modified. For example, both a document and a folder may allow a user to attach object(s) of "secondary type" the same way as "Livelink" categories can be attached to documents and/or folders. "Livelink" was the first Web-based collaboration and document management system from Open Text, which is part of the Open Text ECM Suite. More than one "secondary type" can be attached to the same document/folder. Attributes from an attached "secondary type" is visible on the document/folder GUI of OTIC. An OTIC user can attach or detach "secondary type" from a document/folder. A metalink can attach "secondary type(s)" during import (e.g., using typed module instructions "to write," as explained below). OTIC objects (which contain metadata) can be stored inside of OTIC (e.g., application 1622) and the corresponding definition can be stored inside the OTIC repository (e.g., ECM system 1680). This provides a technical effect of allowing OTIC to retrieve or create a document using CMIS-compliant types to manipulate CMIS data.

In some embodiments, application 1622 may include generic module instructions "to read." Generally, no changes in syntax of "read" instructions may be needed, like Load-EcmItem, ForEachEcmItem, CopyEcmItem and system function GetEcmAliasValue( ). For example, LoadEcmItem can allow loading metadata of "secondary type" object at run-time. New type id for object "secondary type" should be included into UID line. Loaded "secondary type" data can be placed under data tree node "/SecondaryTypes." Furthermore, each "secondary type" can have its own node under "/SecondaryType."

In some embodiments, application 1622 may also include typed module instructions "to write." Typed module instructions can allow creating document, folder, CMIS item, secondary type with attached "secondary type," providing attribute values at run-time. Instruction lines generally respect "secondary type" attribute definitions (e.g., is mandatory, is multi-value, type, default value, is creatable, and so on). FIGS. 19 and 20 provide examples of "secondary types" (CS categories transformed as OTIC objects of the "secondary types," unbeknownst to application 1622) created using typed module instructions "to write." They can be created using the following typed module instructions:

CreateTypedECMItem Doc
    ParamValue /General/Name="valid name"
    ParamValue /Object/ParentID=1122
    ParamValue FileName="FileName.txt"
    ParamValue /SecondaryTypes/SecondaryType/Ext1/Attr_1=#1960/01/01#
    ParamValue /SecondaryTypes/SecondaryType /Ext1/Attr_2=#1960/01/01#
    ParamValue /SecondaryTypes/SecondaryType /Ext1/Attr_3=#1960/01/01#
    ParamValue /SecondaryTypes/SecondaryType /Ext1/cmis:objectId="1313:909090"
    ParamValue /SecondaryTypes/SecondaryType /Ext2/Attr_Int1=0
    ParamValue /SecondaryTypes/SecondaryType /Ext2/Attr_Int2=0
    ParamValue /SecondaryTypes/SecondaryType /Ext2/Attr_Int3=0
    ParamValue /SecondaryTypes/SecondaryType /Ext2/cmis:objectId="1313:12"

In the foregoing description, an ECM-independent ETL tool comprising a CMIS-compliant, repository-specific connector is provided to resolve technical conflicts between CMIS secondary types and certain ECM features such as content server categories, and allow the underlying ECM system to be fully CMIS-compliant. Any application can be adapted to leverage and/or take advantages of the ECM-independent ETL tool disclosed herein.

Figure 28:
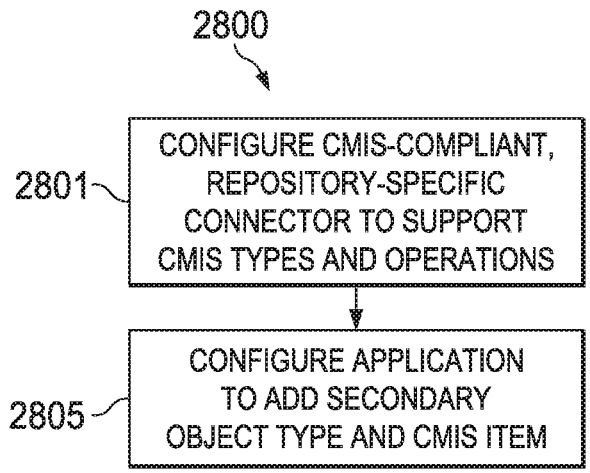
FIG. 28 is a flow chart illustrating an example method of providing an ECM-independent ETL tool.

Accordingly, referring to FIG. 28, in some embodiments, method 2800 for providing an ECM-independent ETL tool may include configuring a CMIS-compliant, repository-specific connector to support CMIS documents, CMIS folders, CMIS primary types, and CMIS secondary types and operations (see FIGS. 17A-17B) (2801). The repository-specific connector can be particularly configured for a repository having categories as primary objects. The repository-specific connector can operate on an integration services server at an integration tier between an application tier and a storage tier where the repository resides.

Method 2800 may further comprise configuring an application operating at the application tier on a user device to add a secondary type object type and a CMIS item object type, as described above (2805). The secondary type object type and the CMIS item object type for the application are primary object types such that CMIS secondary types are attachable to the secondary type object type and the CMIS item object type for the application. The user device can be communicatively connected to the integration services server over a network.

Figure 29:
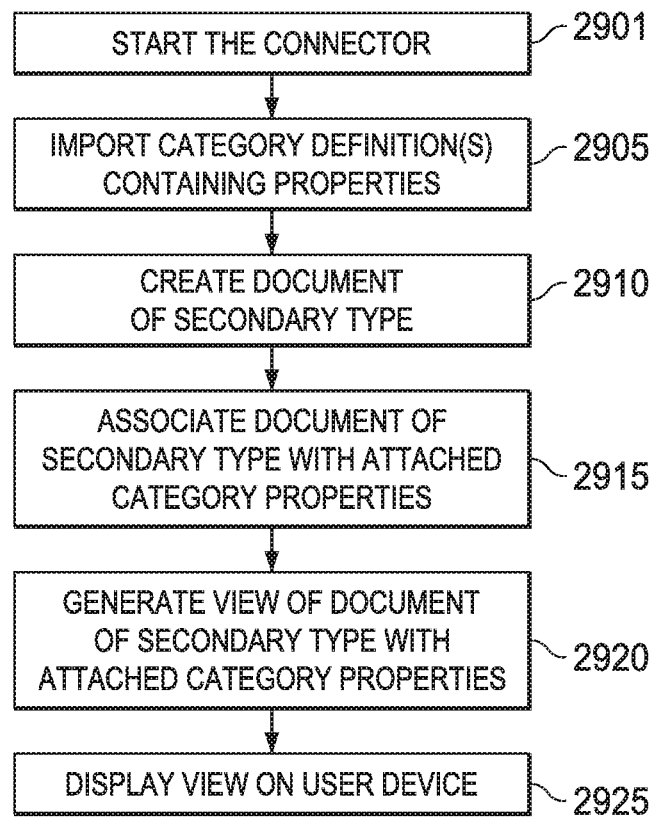
FIG. 29 is a flow charge illustrating an example use case of an ECM-independent ETL tool.

FIG. 29 is a flow chart illustrating an example use case when a user of the application has requested to access a repository via the integration services server on which the CMIS-compliant, repository-specific connector operates. In response, a CMIS connection may be established with the repository and the connector started (2901).

On startup, the connector may operate to import any category definition from the repository (2905). In some embodiments, this operation may be based on an account privilege of the user, as described above. The category definition contains properties associated with a category in the repository that can be dynamically applied to or removed from an object managed by the repository. As a result of this import operation, all the properties are now viewable via a GUI of the integration services server.

In some embodiments, a document of the secondary type object type can be created within the application, for instance, responsive to an instruction from the user of the application (2910). In some embodiments, the document can be created using typed module instructions that obtain the properties from the category definition at run-time via the repository-specific connector. At run-time, if the category is attached to the document, the document is automatically associated with the properties from the category definition (2915). This is possible because the repository-specific connector is configured with a category object type having a category type identifier. The category object type can be inherited from a primary CMIS document type. The category has a category identifier and, if the category is attached to the document, the document is automatically associated with the properties from the category definition via the category type identifier and the category identifier, as explained above.

A view of the document of the secondary type object type can be generated (2920). The view may contain the properties from the category definition. The view can then be displayed on the user device (2925).

Figure 30:
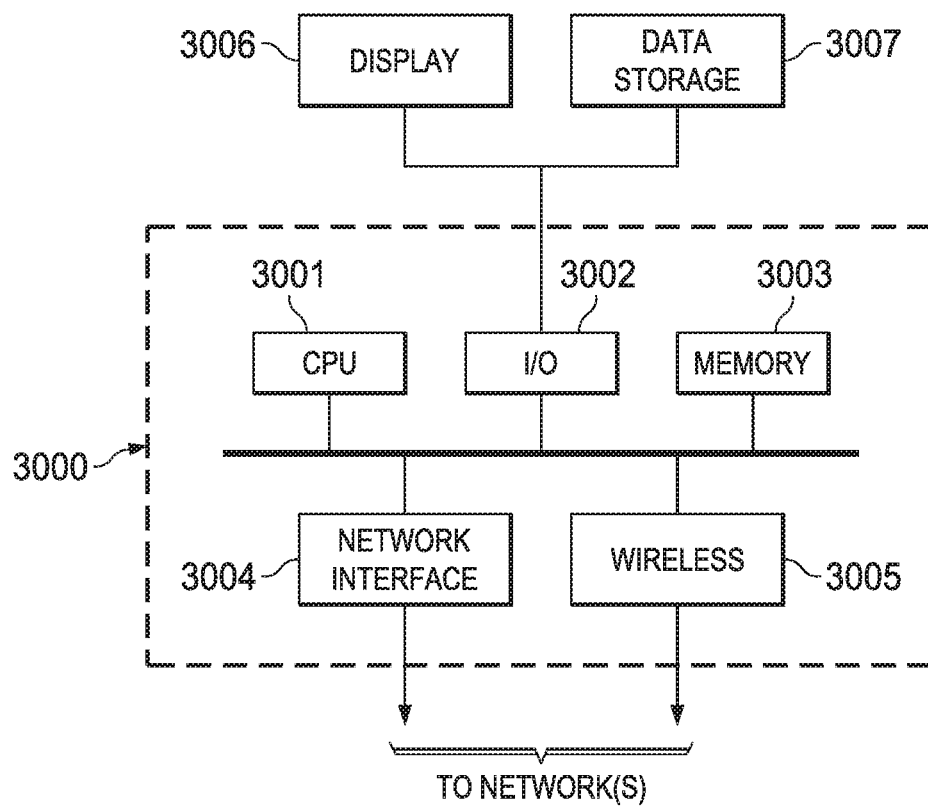
FIG. 30 depicts a diagrammatic representation of a data processing system for implementing portions and components of an information integration system.

FIG. 30 depicts a diagrammatic representation of a data processing system for implementing portions and components of an information integration system. As shown in FIG. 30, data processing system 3000 may include one or more central processing units (CPU) or processors 3001 coupled to one or more user input/output (I/O) devices 3002 and memory devices 3003. Examples of I/O devices 3002 may include, but are not limited to, keyboards, displays, monitors, touch screens, printers, electronic pointing devices such as mice, trackballs, styluses, touch pads, or the like. Examples of memory devices 3003 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 3000 can be coupled to display 3006, information device 3007 and various peripheral devices (not shown), such as printers, plotters, speakers, etc. through I/O devices 3002. Data processing system 3000 may also be coupled to external computers or other devices through network interface 3004, wireless transceiver 3005, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

ROMs, RAMs, and HDs are computer memories for storing computer-executable instructions executable by a CPU or capable of being compiled or interpreted to be executable by the CPU. Suitable computer-executable instructions may reside on a computer readable medium (e.g., a ROM, a RAM, and/or a HD), hardware circuitry or the like, or any combination thereof. Within this disclosure, the term "computer readable medium" or is not limited to ROMs, RAMs, and HDs and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
    configuring a repository-specific connector to support content management interoperability services (CMIS) documents, CMIS folders, CMIS primary types, and CMIS secondary types, the repository-specific connector particularly configured for a repository, the repository having categories as primary objects, the repository-specific connector operating on an integration services server at an integration tier between an application tier and a storage tier, the repository residing at the storage tier;
    configuring an application operating at the application tier on a user device to add a secondary type object type, the user device communicatively connected to the integration services server over a network;
    responsive to a request from a user of the application to access the repository, starting up the repository-specific connector to connect the application with the repository;
    on startup, importing any category definition from the repository based on an account privilege of the user, the importing performed by the repository-specific connector, the category definition containing properties associated with a category in the repository;
    responsive to an instruction from the user of the application to create a document of the secondary type object type, creating the document of the secondary type object type, wherein the document is created using typed module instructions that obtain the properties from the category definition at run-time via the repository-specific connector and, responsive to the category being attached to the document, associating the document with the properties from the category definition;
    generating a view of the document of the secondary type object type containing the properties from the category definition; and
    displaying the view on the user device.

2. The method according to claim 1, wherein the repository-specific connector is configured with a category object type having a category type identifier, the category object type inherited from a primary CMIS document type.

3. The method according to claim 2, wherein the category has a category identifier, wherein the category is attached to the document, and wherein the document is associated with the properties from the category definition via the category type identifier and the category identifier.

4. The method according to claim 1, wherein the application is further configured to add a CMIS item object type.

5. The method according to claim 4, wherein the secondary type object type and the CMIS item object type for the application are primary object types such that CMIS secondary types are attachable to the secondary type object type and the CMIS item object type for the application.

6. The method according to claim 1, wherein the category definition defines additional attributes that can be dynamically applied to or removed from an object managed by the repository.

7. A computer program product comprising at least one non-transitory computer readable medium storing instructions translatable by at least one processor to perform:
    configuring a repository-specific connector to support content management interoperability services (CMIS) documents, CMIS folders, CMIS primary types, and CMIS secondary types, the repository-specific connector particularly configured for a repository, the repository having categories as primary objects, the repository-specific connector operating on an integration services server at an integration tier between an application tier and a storage tier, the repository residing at the storage tier;
    configuring an application operating at the application tier on a user device to add a secondary type object type, the user device communicatively connected to the integration services server over a network;
    responsive to a request from a user of the application to access the repository, starting up the repository-specific connector to connect the application with the repository;
    on startup, importing any category definition from the repository based on an account privilege of the user, the importing performed by the repository-specific connector, the category definition containing properties associated with a category in the repository;
    responsive to an instruction from the user of the application to create a document of the secondary type object type, creating the document of the secondary type object type, wherein the document is created using typed module instructions that obtain the properties from the category definition at run-time via the repository-specific connector and, responsive to the category being attached to the document, associating the document with the properties from the category definition;

generating a view of the document of the secondary type object type containing the properties from the category definition; and displaying the view on the user device.

8. The computer program product of claim 7, wherein the repository-specific connector is configured with a category object type having a category type identifier, the category object type inherited from a primary CMIS document type.

9. The computer program product of claim 8, wherein the category has a category identifier, wherein the category is attached to the document, and wherein the document is associated with the properties from the category definition via the category type identifier and the category identifier.

10. The computer program product of claim 7, wherein the application is further configured to add a CMIS item object type.

11. The computer program product of claim 10, wherein the secondary type object type and the CMIS item object type for the application are primary object types such that CMIS secondary types are attachable to the secondary type object type and the CMIS item object type for the application.

12. The computer program product of claim 7, wherein the category definition defines additional attributes that can be dynamically applied to or removed from an object managed by the repository.

13. A system, comprising:
at least one processor;
at least one non-transitory computer readable medium; and
stored instructions translatable by the at least one processor to perform:
configuring a repository-specific connector to support content management interoperability services (CMIS) documents, CMIS folders, CMIS primary types, and CMIS secondary types, the repository-specific connector particularly configured for a repository, the repository having categories as primary objects, the repository-specific connector operating on an integration services server at an integration tier between an application tier and a storage tier, the repository residing at the storage tier;
configuring an application operating at the application tier on a user device to add a secondary type object type, the user device communicatively connected to the integration services server over a network;
responsive to a request from a user of the application to access the repository, starting up the repository-specific connector to connect the application with the repository;
on startup, importing any category definition from the repository based on an account privilege of the user, the importing performed by the repository-specific connector, the category definition containing properties associated with a category in the repository;
responsive to an instruction from the user of the application to create a document of the secondary type object type, creating the document of the secondary type object type, wherein the document is created using typed module instructions that obtain the properties from the category definition at run-time via the repository-specific connector and, responsive to the category being attached to the document, associating the document with the properties from the category definition;
generating a view of the document of the secondary type object type containing the properties from the category definition; and
displaying the view on the user device.

14. The system of claim 13, wherein the repository-specific connector is configured with a category object type having a category type identifier, the category object type inherited from a primary CMIS document type.

15. The system of claim 14, wherein the category has a category identifier, wherein the category is attached to the document, and wherein the document is associated with the properties from the category definition via the category type identifier and the category identifier.

16. The system of claim 13, wherein the application is further configured to add a CMIS item object type.

17. The system of claim 16, wherein the secondary type object type and the CMIS item object type for the application are primary object types such that CMIS secondary types are attachable to the secondary type object type and the CMIS item object type for the application.

* * * * *